US008630014B2

(12) United States Patent
Fujiwara

(10) Patent No.: US 8,630,014 B2
(45) Date of Patent: Jan. 14, 2014

(54) IMAGE PROCESSING APPARATUS AND IMAGE PROCESSING SYSTEM

(75) Inventor: Noriharu Fujiwara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 586 days.

(21) Appl. No.: 12/623,786

(22) Filed: Nov. 23, 2009

(65) Prior Publication Data

US 2010/0134806 A1 Jun. 3, 2010

(30) Foreign Application Priority Data

Nov. 28, 2008 (JP) ................................ 2008-305530

(51) Int. Cl.
*G06K 15/00* (2006.01)
*H04N 1/00* (2006.01)
*G06K 15/02* (2006.01)

(52) U.S. Cl.
CPC ............ *H04N 1/00681* (2013.01); *G06K 15/02* (2013.01)
USPC ......................................... 358/1.2; 358/449

(58) Field of Classification Search
USPC ............... 358/448, 468, 443, 1.13, 1.12, 400, 358/444, 449, 450, 1.9, 1.18
See application file for complete search history.

(56) References Cited

U.S. PATENT DOCUMENTS

| 4,839,737 | A | * | 6/1989 | Saito | ............................. | 358/406 |
| 5,917,611 | A | * | 6/1999 | Sakai et al. | ................... | 358/400 |
| 2006/0114281 | A1 | * | 6/2006 | Otsuki | ............................ | 347/19 |
| 2007/0201918 | A1 | * | 8/2007 | Shoda et al. | .................. | 399/376 |
| 2009/0021762 | A1 | * | 1/2009 | Saito | ............................ | 358/1.13 |

FOREIGN PATENT DOCUMENTS

| JP | 356066865 | * | 6/1981 | ............. | G03G 15/00 |
| JP | 11065370 | * | 3/1999 | ............... | B41J 29/38 |
| JP | 2000-177218 | A | 6/2000 | | |
| JP | 2010-128979 | A | 6/2010 | | |

* cited by examiner

*Primary Examiner* — Jerome Grant, II
(74) *Attorney, Agent, or Firm* — Panitch Schwarze Belisario & Nadel LLP

(57) ABSTRACT

An image processing apparatus and an image processing system are supplied capable of restraining an occurrence of failure print. The image processing apparatus connected to an image forming apparatus comprises an operation detecting section that detects operations of a document processing section; a document size obtaining section that obtains document size information; a medium size obtaining section that obtains medium size information of print mediums set in the image forming apparatus; a comparing and judging section that compares the document size information and the medium size information and judges whether or not they are consistent; an inquiring section that inquires user whether or not document size of the print object document is changed; an inputting section that inputs a change instruction of the document size; and a changing section that changes the document size information into the medium size information on the basis of the change instruction.

26 Claims, 24 Drawing Sheets

| PROCESS ID | DOCUMENT NAME | LAST INQUIRY TIME |
|---|---|---|
| 4712 | SPECIFICATION. doc | 2008/08/13 10:14:42 |
| 4712 | SPECIFICATIONS. doc | 2008/08/13 10:24:34 |
| 6164 | STATEMENT OF ACCOUNTS. xls | 2008/08/13 12:04:35 |
| 6169 | BUSINESS TRIP ORDER DOCUMENT. xls | 2008/08/13 12:08:31 |

*FIG. 7*

000# IMAGE PROCESSING APPARATUS AND IMAGE PROCESSING SYSTEM

FIELD OF THE INVENTION

The invention relates to an image processing apparatus that generates document data of print object document and generates image data of print use on the basis of the document data, and an image processing system in which an image forming apparatus is connected to the image processing apparatus.

BACKGROUND OF THE INVENTION

In an image processing system that is composed of an image processing apparatus such as a personal computer and an image forming apparatus such as a printer connected to the image processing apparatus, until now, such technology is known to prevent miss print to paper of undesignated size through detecting that paper size of a print object document and paper size of paper set in the image forming apparatus are not consistent by comparing them, before print of the print object document generated in the image processing apparatus.

For example, in a print system disclosed in a patent document 1 mentioned below, when inconsistency of the paper size is detected, a warning scene is displayed in a host computer as the image processing apparatus for urging a selection of any one of a cancel and a continuation of the print, and a change of the paper size. In the warning scene, when the change of the paper size is selected, the host computer changes the paper size of the print object document into paper size of the paper set in the printer, generates print data, and transmits it to the printer.

Patent document 1: Japan Patent Publication of No. 2000-177218

However, after the paper size of the print object document is changed, there is a case that a change occurs in a paragraph position of the document and an arrangement of images, so an undesirable layout is produced. However, in the disclosed technology mentioned above, even after the change occurs in the layout, because print is executed that is exactly as it was, so it results in a failure print. As a result, expendable supplies such as toner, paper and the like are wasted.

Therefore, an image processing apparatus and an image processing system are desired capable of restraining occurrence of failure print.

SUMMARY OF THE INVENTION

It is, therefore, an object of the invention to provide an image processing apparatus and an image processing system that can solve the above problem.

A first aspect of the invention is to provide an image processing apparatus connected to an image forming apparatus, that has a document processing section for performing a creation and an editing of document data of a print object document on the basis of document size information; an instructing section for instructing to print the print object document; and a converting section for converting the document data into print use image data for sending to the image forming apparatus on the basis of the instruction, comprising: an operation detecting section that detects an operation of the document processing section; a document size obtaining section that obtains the document size information; a medium size obtaining section that obtains medium size information of print mediums set in the image forming apparatus; a comparing and judging section that compares the document size information and the medium size information that are obtained, and judges whether or not they are consistent; an inquiring section that inquires a user whether or not document size of the print object document is changed when the document size information and the medium size information are not consistent; an inputting section that inputs a change instruction of the document size; and a changing section that changes the document size information into the medium size information on the basis of the change instruction.

A second aspect of the invention is to provide an image processing system that includes an image forming apparatus for forming images onto print mediums and an image processing section that is connected to the image forming apparatus and has a document processing section for performing a creation and an editing of document data of a print object document on the basis of document size information; a instructing section for instructing to print the print object document; and a converting section for converting the document data into print use image data for sending to the image forming apparatus on the basis of the instruction, wherein the image processing apparatus comprises: an operation detecting section that detects operations of the document processing section; a document size obtaining section that obtains the document size information; a medium size obtaining section that obtains medium size information of print mediums set in the image forming apparatus; a comparing and judging section that compares the document size information and the medium size information that are obtained, and judges whether or not they are consistent; an inquiring section that inquires a user whether or not document size of the print object document is changed when the document size information and the medium size information are not consistent; an inputting section that inputs a change instruction of the document size; and a changing section that changes the document size information into the medium size information on the basis of the change instruction.

THE EFFECT OF THE PRESENT INVENTION

According to the image processing apparatus of the present invention, after an operation of the document processing section is detected, document size of a print object document and medium size of print mediums set in the image forming apparatus are compared, and when they are not consistent, an inquiry whether or not document size is changed is executed, so it is possible to change the document size into the medium size of print mediums before the print instruction. Therefore, it is possible to avoid failure print, and waste of expendable supplies is restrained.

The above and other objects and features of the present invention will become apparent from the following detailed description and the appended claims with reference to the accompanying drawings.

BRIEF DESCRIPTION OF THE DRAWINGS

FIG. 7 is an explanation diagram showing a structure of a storing section;

DETAILED DESCRIPTION OF THE PREFERRED EMBODIMENTS

Embodiments of the invention will be described in detail hereinbelow with reference to the drawings.

Hereinbelow, it is to explain enforcement form of the present invention in detail by using figures. Here, it is to explain an example in the case to apply to a printer system that is composed of a personal computer and a printer of the present invention.

Embodiment 1

Figure 3:
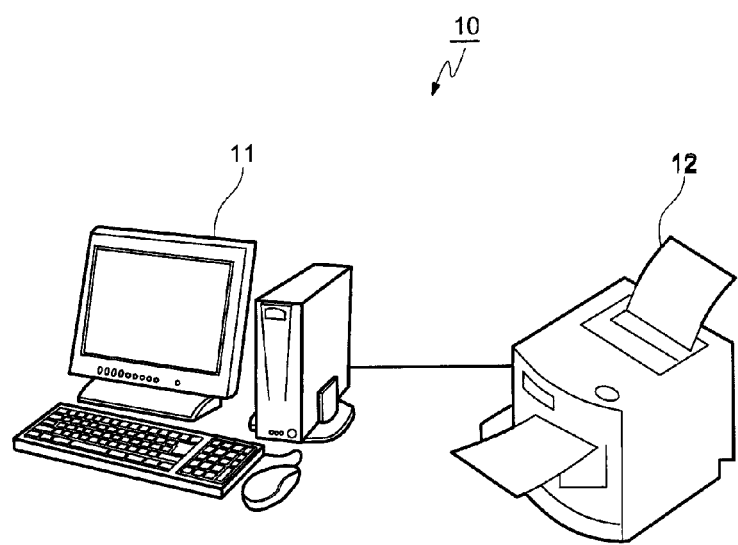
FIG. 3 is a diagram showing a structure of a printer system of the present invention.

FIG. 3 is a diagram showing a structure of a printer system of the present invention.

Figure 2:
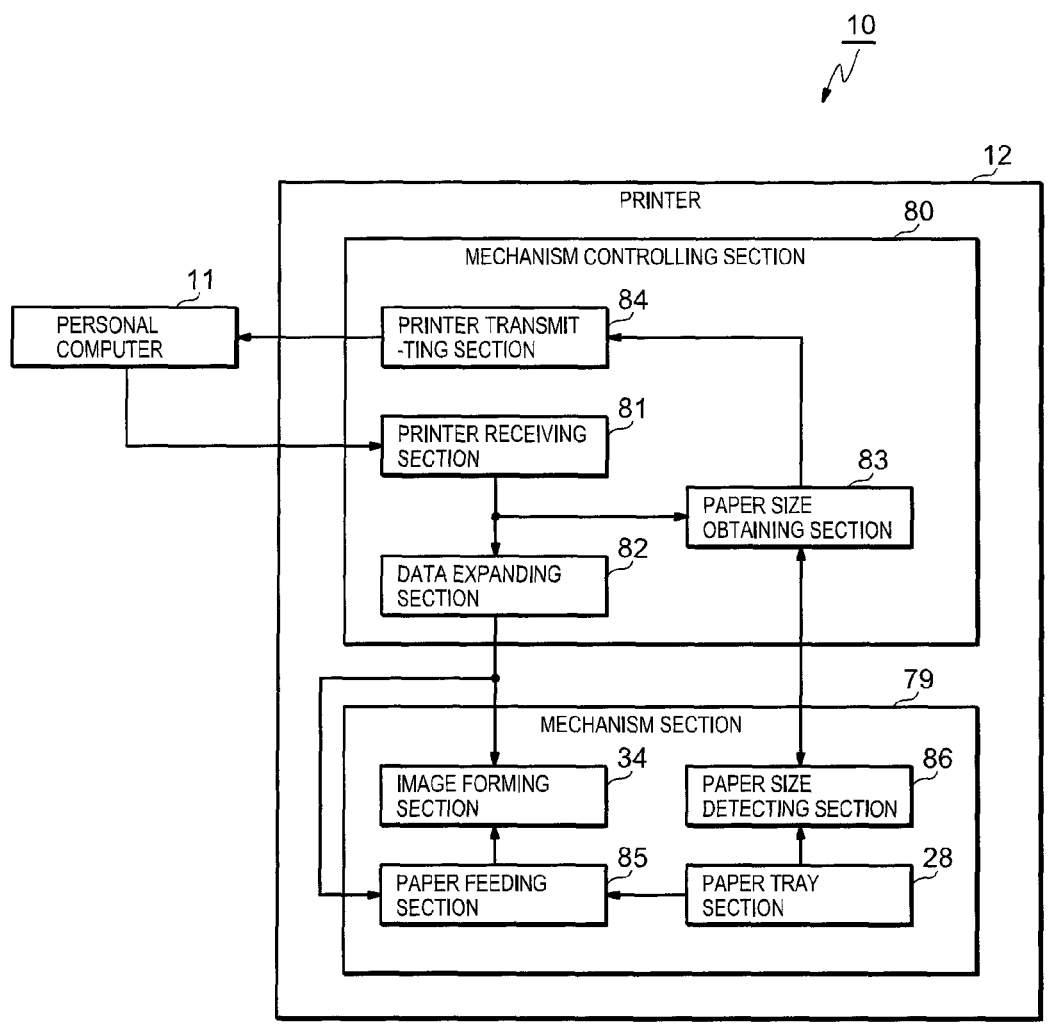
FIG. 2 is a block diagram showing a function structure of a printer in embodiment 1.

A printer system 10, as an image processing system, as shown by FIG. 2, comprises a personal computer 11 as an image processing apparatus and a printer 12 as an image forming apparatus. It is possible to print documents generated in the personal computer 11 through the printer 12 by using the printer system 10.

Firstly, it is to explain about the personal computer 11 that forms the printer system 10 of the present embodiment.

Figure 4:
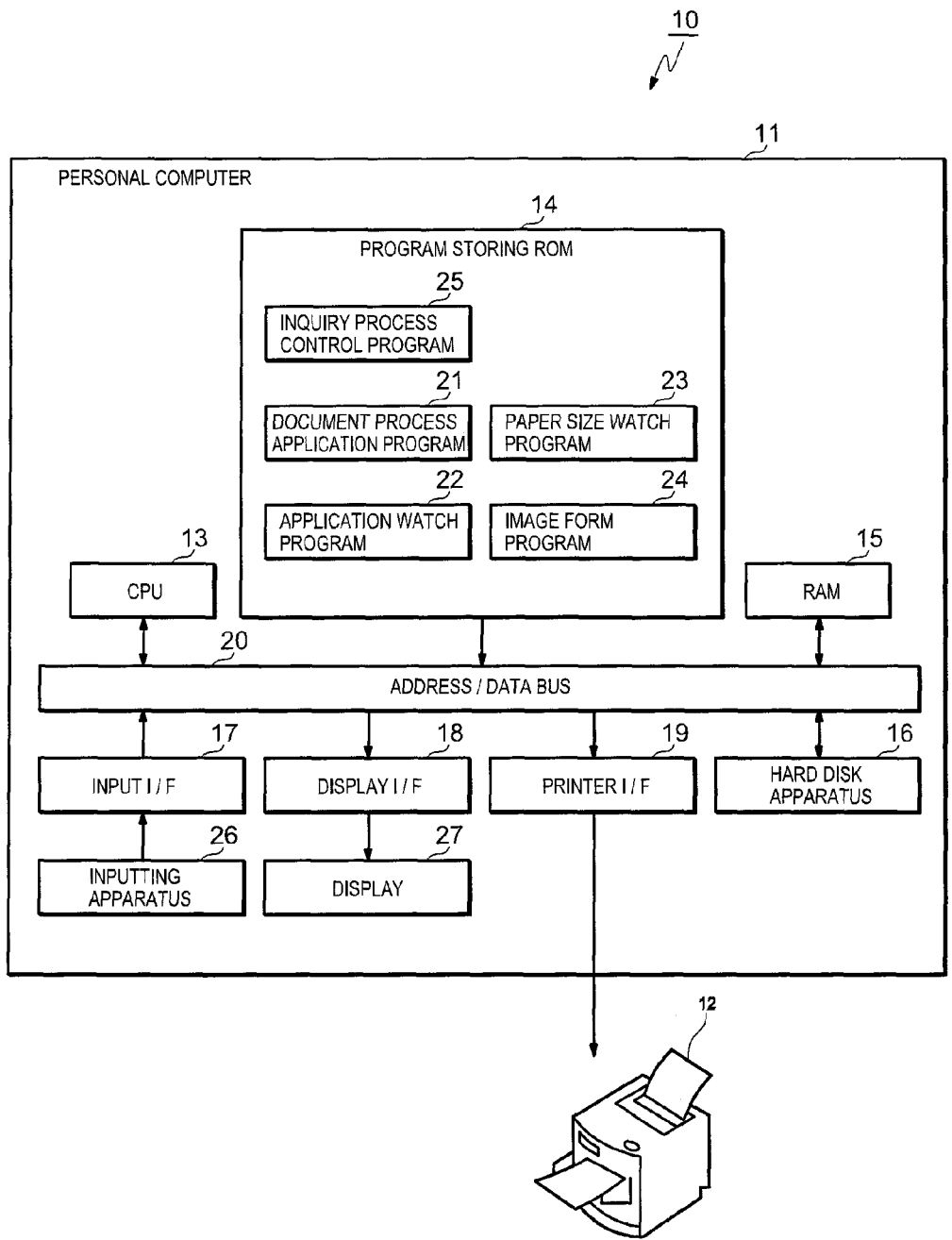
FIG. 4 is a block diagram concretely showing a structure of a personal computer of the present invention.

FIG. 4 is a block diagram concretely showing a structure of a personal computer of the present invention.

In the personal computer 11, as shown by FIG. 4, a CPU 13, a program storing ROM 14, a RAM 15, a hard disk apparatus 16, an input I/F 17, a display I/F 18 and a printer I/F 19 are mutually connected through an address/data bus 20.

The CPU (Central Processing Unit) 13 is a center processing apparatus for performing a general control of the personal computer 11, regards the RAM 15 as a work region, and executes all kinds of programs stored in the program storing ROM 14.

The program storing ROM (Read Only Memory) 14 is a non-volatile read only memory, and stores all kinds of programs. In the personal computer 11 of the present embodiment, as shown by FIG. 4, a document process application program 21, an application watch program 22, a paper size watch program 23, an image form program 24 and an inquiry process control program 25 are stored in the program storing ROM 14.

The document process application program 21 is an application program for executing edit, storing, display and print of document information composed of texts, images, figures and the like.

The application watch program 22 is a program for obtaining and notifying information with respect to operations of the document process application program 21.

The paper size watch program 23 is a program for obtaining paper size information representing size of paper set in the printer 12.

The image form program 24 is a program for generating image data for print in the printer 12 on the basis of document data.

The inquiry process control program 25 is a program for executing a comparing and judging process and an inquiring process that are mentioned below.

The RAM (Random Access Memory) 15 is a volatile memory, and is a primary storage device used as a work region when programs are executed through the CPU 13.

The hard disk apparatus 16 is a secondary storage device capable of reading and writing larger amount of data than the program storing ROM 14 and the RAM 15, and stores document file that is storing destination of document information those edit and print are executed by using the document process application program, other necessary data and the like as a storing section.

Moreover, it is also possible to adopt a structure that stores respective programs stored in the program storing ROM 14, that is, the document process application program 21, the application watch program 22, the paper size watch program 23, the image form program 24 and the inquiry process control program 25 in the hard disk apparatus 16.

The input I/F 17 is an interface section for performing input of data from an inputting apparatus 26.

The inputting apparatus 26, as shown by FIG. 3, is composed of a keyboard and a mouse in the present embodiment, and performs input of all kinds of input information and selection information on the basis of operations of a user.

The display I/F 18 is an interface section of a display 27 that is a display apparatus.

The display 27 is capable of displaying a plurality of windows, and performs display of an inquiry scene and a paper size warning scene that are mentioned below.

The printer I/F 19 is an interface section for performing communication with the printer 12.

Next, it is to explain about a function structure of the personal computer 11 of the present embodiment.

Figure 1:
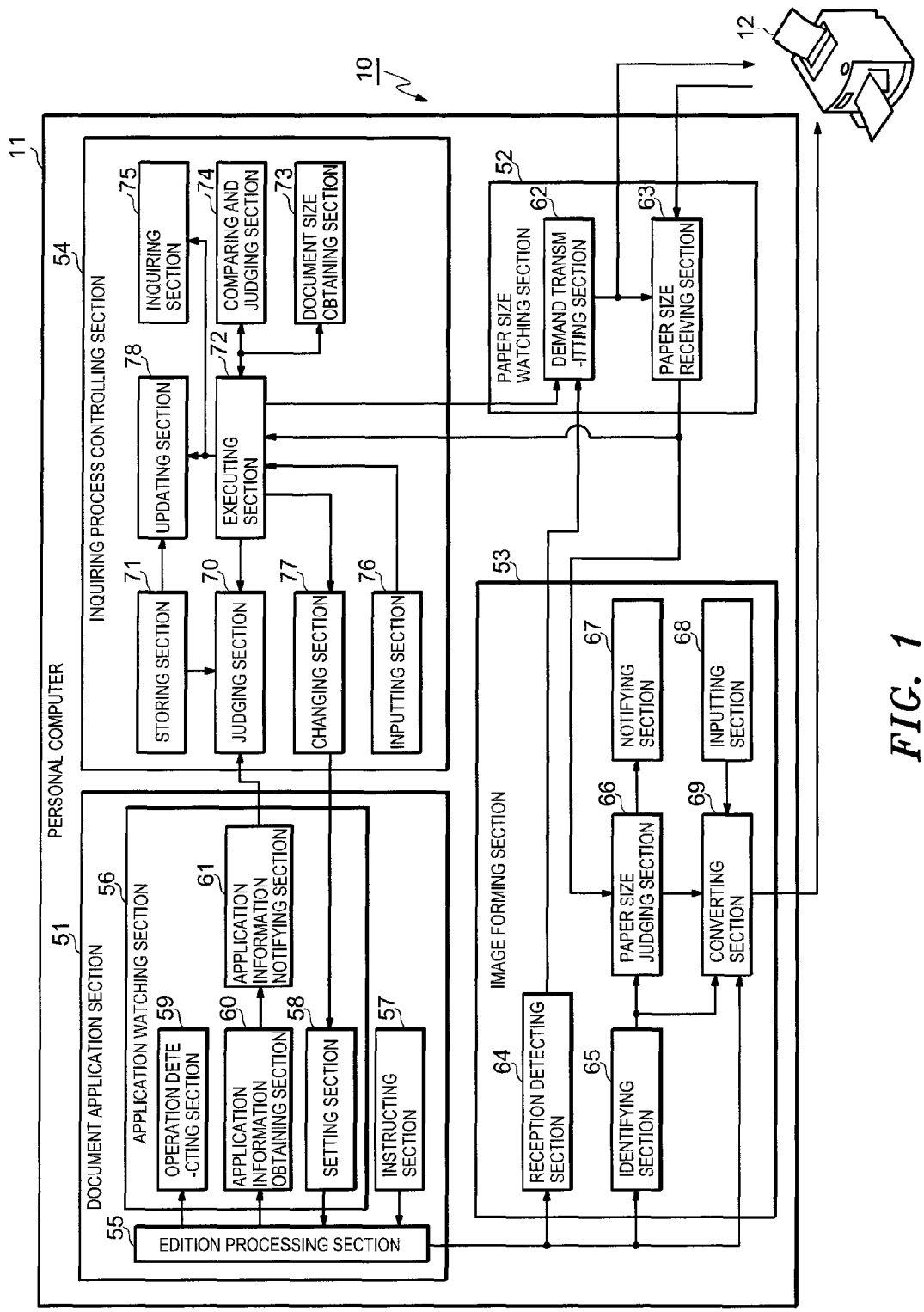
FIG. 1 is a block diagram showing a function structure of a personal computer in embodiment 1 of the present invention.

FIG. 1 is a block diagram showing a function structure of a personal computer in embodiment 1 of the present invention.

The personal computer 11, as an image processing apparatus, as shown by FIG. 1, includes a document process application section 51, a paper size watching section 52, an image forming section 53 and an inquiring process controlling section 54.

The document process application section 51, as shown by FIG. 1, is composed of an edition processing section 55, an application watching section 56 for watching an operation of the edition processing section 55, and an instructing section 57 for performing a print instruction to the edition processing section 55.

The edition processing section 55 is a processing section which operates when the document process application program 21 (FIG. 4) is executed through the CPU 13, and performs a document process such as a new creation, edit and the like of document information as a document processing section. For example, the edition processing section 55 reads out one or plural document information from a document file in the hard disk apparatus 16 (FIG. 4), converts the document information into document data that is in the form of an inner process, and performs respective processes for display, print and the like on the basis of the document data. Further, the edition processing section 55 perform edit of the read out document information, performs creation of new document information, and then stores the edited or newly created document information in the document file. Furthermore, the edition processing section 55 transmits a document that is an object of a print process, that is, the document data of the print object document to the image forming section 53. The document that is an object of the document process by the edition processing section 55 is generically called a process object document.

The application watching section 56, as shown by FIG. 1, has a setting section 58, an operation detecting section 59, an application information obtaining section 60 and an application information notifying section 61. The application watching section 56 corresponds to the application watch program 22 (FIG. 4), as a function extension module of the document process application section 51, is a plug-in which operates in the inside of respective processes executed in the CPU 13. The application watching section 56, through performing communication with the edition processing section 55 by using an API (Application Programming Interface) opened through the edition processing section 55, watches an operation of the edition processing section 55, and notifies the paper size watching section 52 of it.

The setting section 58, with respect to a process object document in the document process of the edition processing section 55, performs a setting of document size information. Here, the document size information is data representing paper size of the document corresponding to the document information.

The operation detecting section 59 performs communication with the edition processing section 55, and detects that the following respective operations such as a document file open operation, a new document creation operation, a paper setting change operation, a document selection operation and a window activation operation are performed in the document process application section 51 containing the edition processing section 55. Next, it is to explain the respective operations detected by the operation detecting section 59. Moreover, the respective operations detected by the operation detecting section 59 are generically called document process operations.

The document file open operation corresponds to an operation in which a document file stored in the hard disk apparatus 16 (FIG. 4) is opened through the edition processing section 55, that is, a document file is registered, and a corresponding window is displayed on the display 27 (FIG. 24) for the first time.

The new document creation operation represents an operation in which new document information is created by the edition processing section 55.

The paper setting change operation represents an operation in which document size information is set by the setting section 58 with respect to the process object document that is in a document process through the edition processing section 55.

The document selection operation is an operation in which a process object document is selected in the document process application section 51. The document process application section 51 is capable of executing parallel document processes with respect to a plurality of process object documents. On executing the parallel document processes, each window corresponding to respective process object documents is respectively displayed on the display 27 of the personal computer 11; a user operates the inputting apparatus 26 so as to select any one of process object document. The document process application section 51 selects any one of process object document on the basis of the input from the inputting apparatus 26; the edition processing section 55 executes a document process with respect to the selected process object document. The operation detecting section 59 detects the operation in which the process object document is selected as the document selection operation.

The window activation operation represents an operation in which a window corresponding to the document process application section 51 is activated among respective windows displayed on the display 27. On displaying a plurality of windows on the display 27, windows those are objects of input and operation through the inputting apparatus 26 are called as active windows, and the other windows are regarded as non-active windows. The window activation operation corresponds to an operation in which any one of window is switched from non-active window to active window. The document process application section 51 executes the window activation operation on the basis of the input from the inputting apparatus 26.

The operation detecting section 59, after detected the document process operation mentioned above, performs an instruction for the application information obtaining section 60 to obtain application information. The operation detecting section 59 notifies the application information obtaining section 60 of the obtainment instruction and detection operation names representing kinds of the detected operations. Moreover, with respect to respective operations mentioned above, the detection operation names sent to the application information obtaining section 60 through the operation detecting section 59 are respectively "document file open", "new document creation", "paper setting change", "document selection" and "window activation".

The application information obtaining section 60, on the basis of the obtainment instruction from the operation detection section 59, performs communication with the edition processing section 55 to obtain application information. Here, the application information obtained through the application information obtaining section 60 is composed of a process ID of a process corresponding to a operation detected by the operation detecting section 59, a detection operation name representing a kind of the detected operation, a document name as document discrimination information of a process object document and document size information of the process object document. The application information obtaining section 60 notifies the application information obtaining section 60 of the obtained application information.

The application information notifying section 61 notifies the inquiring process controlling section 54 of the application information obtained by the application information obtaining section 60.

The paper size watching section 52, as shown by FIG. 1, includes a demand transmitting section 62 and a paper size receiving section 63. The paper size watching section 52 corresponds to the paper size watch program 23 (FIG. 4), performs communication with the printer 12 through the printer I/F 19 to obtain paper size information of paper set in the printer 12.

The demand transmitting section 62 transmits a transmission demand of paper size information to the printer 12 on the basis of an obtainment demand (mentioned below) from the image forming section 53 or the inquiring process controlling section 54. Further, the demand transmitting section 62 notifies the paper size receiving section 63 of obtainment demand source information representing that the obtainment demand source is any one of the image forming section 53 and the inquiring process controlling section 54.

The paper size receiving section 63, as a medium size receiving section and a medium size obtaining section, receives paper tray information containing paper size information as medium size information from the printer 12, and obtains paper size information. Then, the paper size receiving section 63 notifies the image forming section 53 or the inquiring process controlling section 54 of the obtained paper size information on the basis of the obtainment demand source information informed from the demand transmitting section 62.

The image forming section 53, as shown by FIG. 1, includes a reception detecting section 64, an identifying section 65, a paper size judging section 66, a notifying section 67, an inputting section 68 and a converting section 69. The image forming section 53 corresponds to the image form program 24 (FIG. 4), receives document data from the document process application section 51, and generates image data for print in the printer 12.

The reception detecting section 64 detects a receiving of document data from the document process application section 51, and performs an obtainment demand for the paper size watching section 52 in order to obtain paper size information from the printer 12.

The identifying section 65 receives document data from the document process application section 51, and identifies document size information and tray designation information that are contained in the document data. Here, the tray designation information is data for designating a paper tray that is a paper feeding source of paper as a paper feeding source tray in the case of print process in the printer 12, and is any one of "lower paper tray", "upper paper tray" and "automatic selection" in the present embodiment. However, the tray designation information "automatic selection" means that the paper feeding source tray is automatically selected on the basis of the document size information.

The paper size judging section 66 judges whether or not document size of the print object document and paper size of the paper feeding source tray are consistent on the basis of the document size information and the tray designation information that are identified by the identifying section 65, and the paper size information that is informed from the paper size watching section 52. The paper size judging section 66, when it is judged that they are not consistent, that is, inconsistent, performs a notification instruction to the notifying section 67. Further, when it is judged that they are consistent, the paper size judging section 66 performs a convert instruction to the converting section 69.

The notifying section 67 has a function of controlling the display 27 (FIG. 4) through the display I/F 18 (FIG. 4), and displays a paper size warning scene on the display 27 for notifying of the inconsistency of the document size and the paper size.

Figure 5:
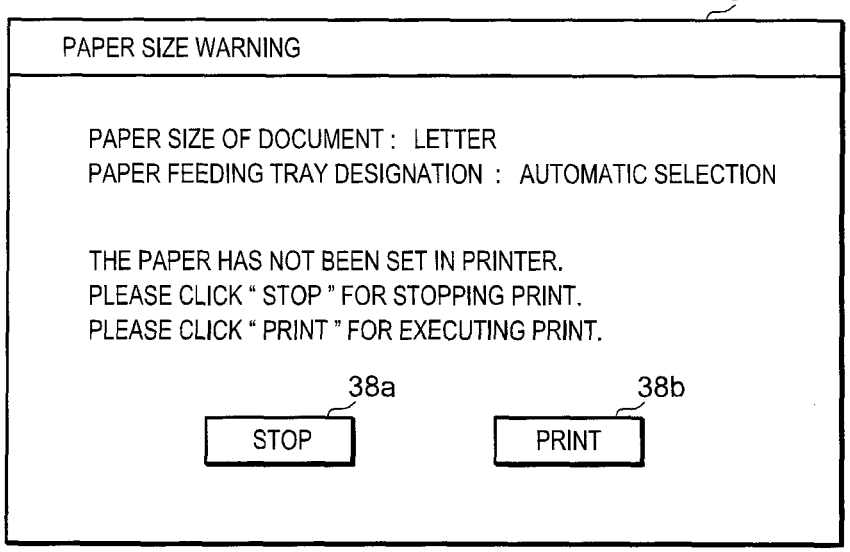
FIG. 5 is a diagram showing an example of a paper size warning scene.

FIG. 5 is a diagram showing an example of a paper size warning scene.

On a paper size warning scene 37, as shown by FIG. 5, a message is displayed representing that document size of the print object document and paper size of the paper set in the paper feeding source tray of the printer 12 are not consistent. Further, the paper size warning scene, as shown by FIG. 5, has a "stop" selection button 38*a* for selecting a stop of print and a "print" selection button 38*b* for selecting a continuation of print.

The inputting section 68 has a function of inputting data on the basis of the input from an input apparatus (FIG. 4) through the display I/F 18 (FIG. 4), and inputs a stop instruction for instructing a stop of print or a continuation instruction for instructing a continuation of print on the basis of a selection of user on the paper size warning scene 37 (FIG. 5).

The converting section 69 converts the document data received from the document process application section 51 into image data for print in the printer 12 on the basis of the convert instruction from the paper size judging section 66 or the continuation instruction from the inputting section 68. The converting section 69 transmits the generated image data and the designation tray information to the printer 12.

The inquiring process controlling section 54, as shown by FIG. 1, includes a judging section 70, a storing section 71, an executing section 72, a document size obtaining section 73, a comparing and judging section 74, an inquiring section 75, an inputting section 76, a changing section 77 and an updating section 78. The inquiring process controlling section 54 corresponds to the inquiry process control program 25 (FIG. 4), and executes a comparing and judging process and an inquiring process.

The judging section 70 judges need/needlessness of a comparing and judging process on the basis of the application information informed from the document process application section 51 and the storing section 71. After it is judged that the comparing and judging process is executed, the judging section 70 performs an execution instruction to the executing section 72.

FIG. 7 is an explanation diagram showing a structure of a storing section.

In the storing section 71, as shown by FIG. 7, last inquiry time information that is time information is stored corresponding to a process ID and a document name. Here, the last inquiry time information represents a last time execution time in the inquiring section 75. The process ID, the document name and the last inquiry time information are generically called inquiry history information.

For example, in the storing section 71 that is shown in the FIG. 7, last inquiry time information "2008/08/13 10:14:42" is stored corresponding to process ID "4712" and document name "specifications.doc".

The executing section 72 obtains document size information and paper size information on the basis of the execution instruction from the judging section 70, and performs an obtainment instruction to the document size obtaining section 73 and the paper size watching section 52 in order to execute a comparing and judging process. Then, the executing section 72, after respectively received the document size information from the document size obtaining section 73 and the paper size information from the paper size watching section 52, transmits the document size information and the paper size information to the comparing and judging section 74.

Further, the executing section 72, on the basis of the judgment result informed from the comparing and judging section 74, performs an inquiry instruction to the inquiring section 75 and an updating instruction to the updating section 78; and executes a notification of convert size information to the changing section 77 and the like.

The document size obtaining section 73, on the basis of the judgment result informed from the comparing and judging section 74, analyzes the application information informed from the document process application section 51, and obtains document size information. The document size obtaining section 73 notifies the executing section 72 of the obtained document size information.

The comparing and judging section 74 receives document size information and paper size information from the executing section 72, compares the document size information and the paper size information, and judges whether or not they are consistent. The comparing and judging section 74 notifies the executing section 72 of the judgment result representing consistency/inconsistency.

The inquiring section 75 is a processing section for controlling the display 27 (FIG. 4) through the display I/F 18 (FIG. 4) and to execute an inquiring process to a user; notifies of the inconsistency of the document size and the paper size on the basis of the inquiry instruction from the executing section 72; and displays an inquiry scene on the display 27 for inquiring the user whether or not the document size is changed.

Figure 6:
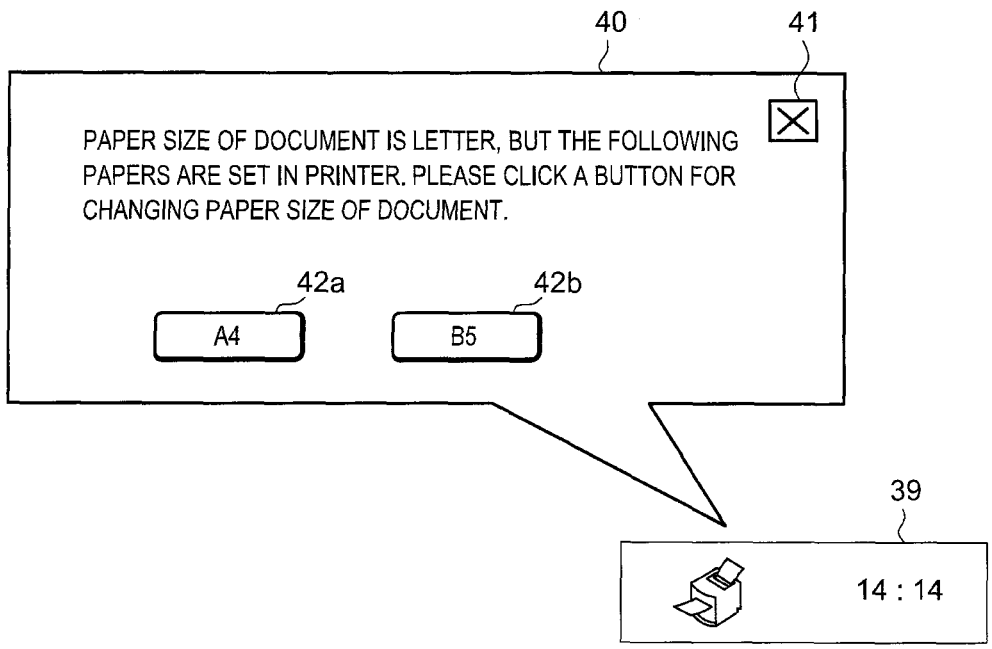
FIG. 6 is a diagram showing an example of an inquiry scene.

FIG. 6 is a diagram showing an example of an inquiry scene.

The inquiring section 75 executes an API call of an OS (Operation System), as shown by FIG. 6, makes to display an inquiry scene 40 that is balloon window in the neighborhood of a display region of a task bar 39 on the display 27. On the inquiry scene 40, as shown by FIG. 6, a message representing that document size of process object document and paper size of paper set in the printer are not consistent is displayed. Further, the inquiry scene 40, as shown by FIG. 6, has a button 41 for opening a balloon window, and selection buttons 42a and 42b for changing the document size of the process object document into the paper size of the printer 12.

The inputting section 76 inputs a change instruction of document size and tray designation information of a paper tray in which paper is set in order to change on the basis of the input from the inputting apparatus 26 (FIG. 4) through the display I/F 18 (FIG. 4).

The changing section 77, after informed of change paper size information from the executing section 72, transmits a change demand and change size information to the document process application section 51.

The updating section 78 updates the storing section 71 on the basis of an updating instruction from the executing section 72.

Next, it is to explain the printer 12 forming the printer system 10 of the present embodiment.

Figure 8:
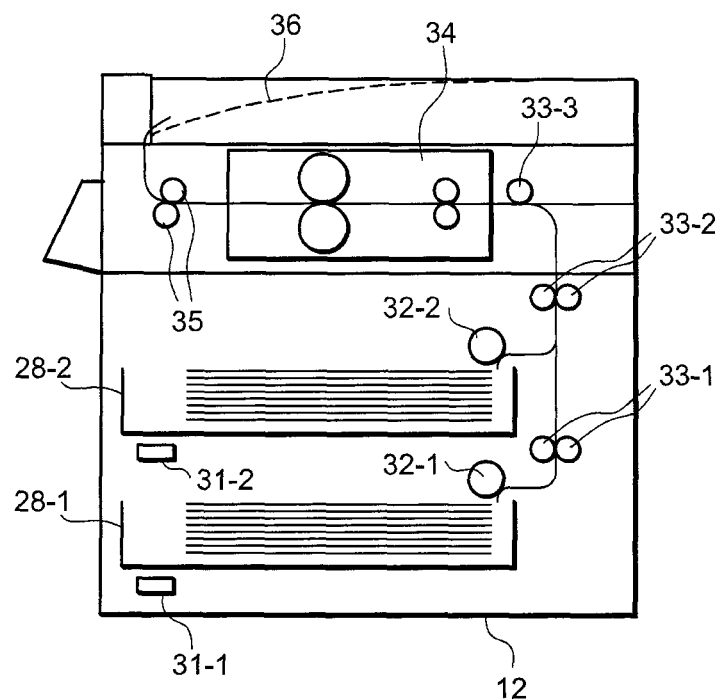
FIG. 8 is an outline section diagram of a printer.

FIG. 8 is an outline section diagram of a printer.

The printer 12 is an image forming apparatus that receives image data from the personal computer 11 and forms an image onto the paper as a print medium on the basis of the image data. In the present embodiment, in the printer 12, as shown by FIG. 8, two paper trays of lower paper tray 28-1, upper paper tray 28-2 are set up as a paper tray section 28 that is an accommodating section accommodating paper. Here, the lower paper tray 28-1 corresponds to tray designation information "lower paper tray"; the upper paper tray 28-2 corresponds to tray designation information "upper paper tray".

Figure 9:
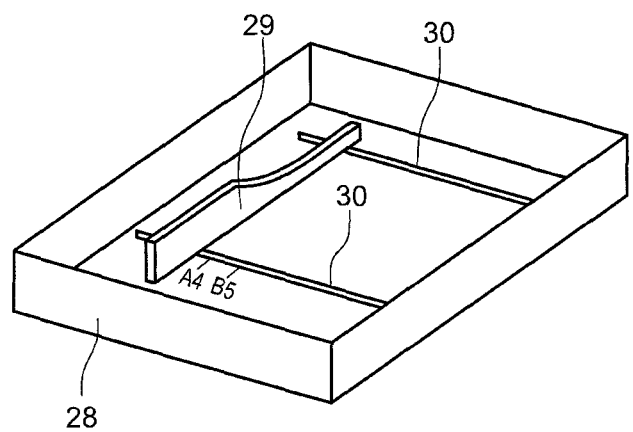
FIG. 9 is a diagram showing a structure of a paper tray.

FIG. 9 is a diagram showing a structure of a paper tray.

In respective paper tray of the paper tray section 28, that is, the lower paper tray 28-1 and the upper paper tray 28-2, a paper guide 29 is set up into width direction of accommodated paper, that is, one side of orthogonal direction with paper feeding direction. The paper guide 29 is provided slide free by following two ditches 30 that are set into parallel with the base of paper tray, is connected with the side of the accommodated paper, and regulates a position of the width direction of the paper.

Further, in the printer 12, in the inside base of the lower paper tray 28-1 and the upper paper tray 28-2, as shown by FIG. 8, optics sensors 31-1 and 31-2 are respectively furnished. The optics sensors 31-1 and 31-2 detect the positions of the paper guides 29 in respective paper trays.

Furthermore, in the neighborhood of the lower paper tray 28-1 and the upper paper tray 28-2, as shown by FIG. 8, hopping rollers 32-1 and 32-2 are respectively furnished. After the hopping roller 32-1 started to rotate, paper accommodated in the lower paper tray 28-1 is fed every one sheet, and is conveyed into an image forming section 34 along with the rotation paper feeding rollers 33-1, 33-2 and 33-3. Further, after the hopping roller 32-2 started to rotate, paper accommodated in the upper paper tray 28-2 is fed every one sheet, and is conveyed into the image forming section 34 along with the rotation paper feeding rollers 33-2 and 33-3.

The image forming section 34 forms an image on the basis of image data onto the conveyed paper. Then, paper on which the image is formed is ejected to an ejection tray 36 through the rotation of an ejection roller 35.

Figure 10:
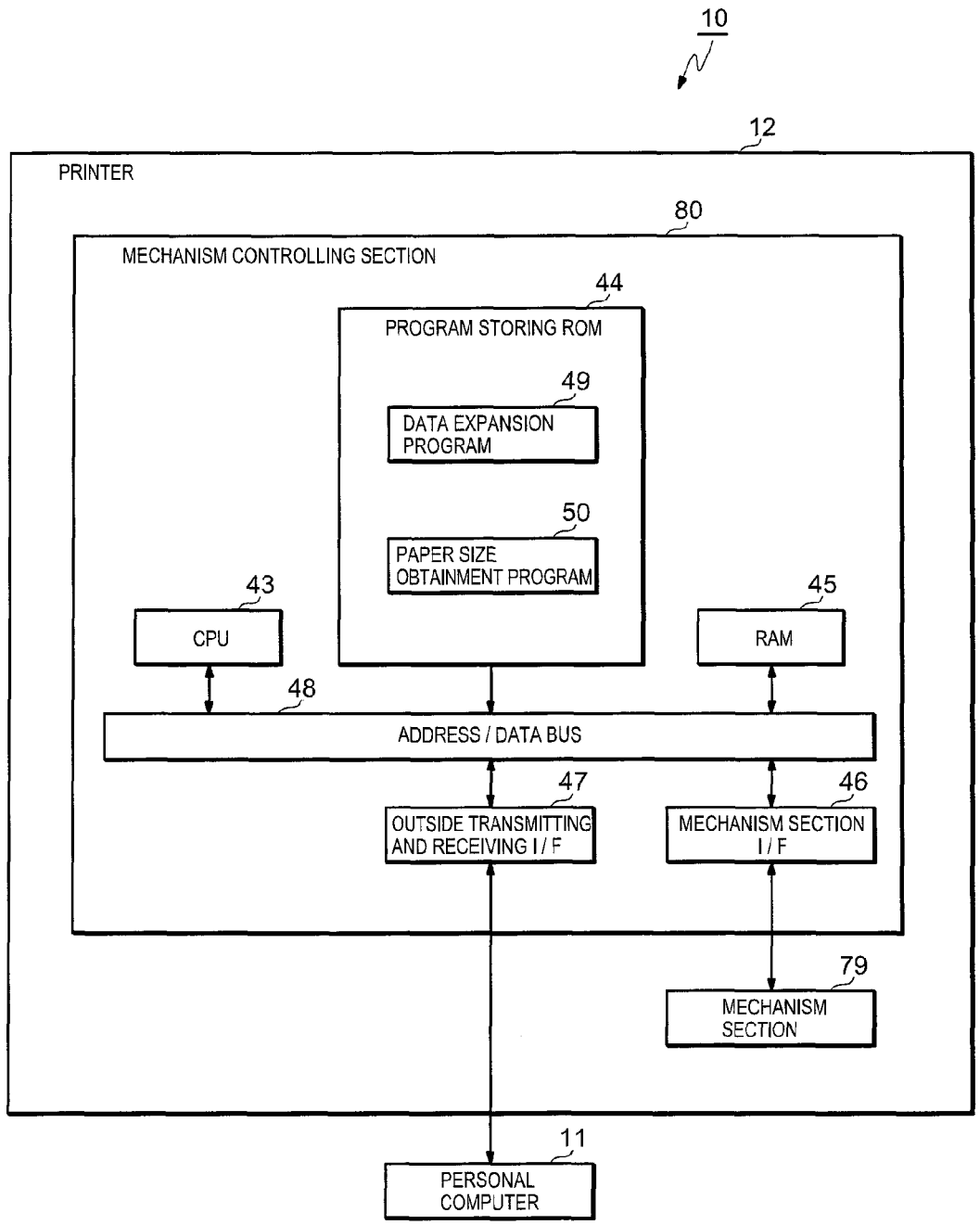
FIG. 10 is a block diagram concretely showing a structure of a printer.

FIG. 10 is a block diagram concretely showing a structure of a printer.

The printer 12, as shown by FIG. 10, is composed of a mechanism section 79, and a mechanism controlling section 80 for controlling the mechanism section 79.

The mechanism section 79 includes a paper tray section 28 and an image forming section 34.

In the mechanism controlling section 80, as shown by FIG. 10, a CPU 43, a program storing ROM 44, a RAM 45, a mechanism section I/F 46 and an outside transmitting and receiving I/F 47 are mutually connected through an address/data bus 48.

The CPU 43 is a center processing apparatus for performing a general control of the printer 12, regards the RAM 45 as a work region, and executes all kinds of programs stored in the program storing ROM 44.

The program storing ROM 44 is a non-volatile read only memory, and stores a data expansion program 49 and a paper size obtainment program 50 in the present embodiment, as shown by FIG. 10.

The data expansion program 49 is a program for performing an expanding process of image data.

The paper size obtainment program 50 is a program for obtaining paper size information representing paper size of paper accommodated in the paper tray section 28.

The RAM 45 is a volatile memory, and is used as a work region when all kinds of programs are executed through the CPU 43.

The mechanism section I/F 46 is an interface section for performing communication with the mechanism section 79.

The outside transmitting and receiving I/F 47 is an interface section for performing communication with the personal computer 11.

Next, it is to explain a function structure of the printer 12 of the present embodiment.

FIG. 2 is a block diagram showing a function structure of a printer in embodiment 1.

The printer 12, as an image forming apparatus, as shown by FIG. 2, comprises a mechanism section 79 and a mechanism controlling section 80.

The mechanism controlling section 80, as shown by FIG. 2, includes a printer transmitting section 81, a data expanding section 82, a paper size obtaining section 83 and a printer transmitting section 84.

The printer transmitting section 81 receives image data and tray designation information from the personal computer 11. Further, the printer transmitting section 81, as a demand receiving section, receives a transmission demand of paper size information from the personal computer 11.

The data expanding section 82 is a processing section that operates by executing the data expansion program through the CPU 43, receives image data and tray designation information from the printer transmitting section 81, and performs an expanding process of the image data. The expanded image data and the tray designation information are sent to the mechanism section 79.

The paper size obtaining section 83 corresponds to the paper size obtainment program 50, and performs a detection instruction to the mechanism section 79 on the basis of a transmission demand from the personal computer 11 in order to obtain paper size information. Then, the paper size obtaining section 83, after received guide position information from the mechanism section 79, obtains paper size information on the basis of the guide position information, and generates paper tray information. The generated paper tray information is sent to the printer transmitting section 84.

Figure 11:
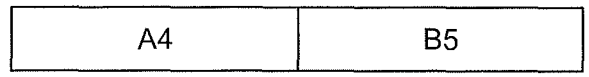
FIG. 11 is a first explanation diagram showing a structure of paper tray information.

FIG. 11 is a first explanation diagram showing a structure of paper tray information.

The paper size obtaining section 83 obtains paper size information of paper set in respective paper trays on the basis of the guide position information. That is, the paper size obtaining section 83 obtains paper size information of paper set in the lower paper tray 28-1 on the basis of the guide position information detected from the lower paper tray 28-1. Further, the paper size obtaining section 83 obtains paper size information of paper set in the upper paper tray 28-2 on the basis of the guide position information detected from the upper paper tray 28-2. Then, the paper size obtaining section 83 generates paper tray information containing the paper size information.

For example, paper tray information shown by FIG. 1, is composed of paper size information "A4" corresponding to the lower paper tray 28-1 and paper size information "B5" corresponding to the upper paper tray 28-2. That is, in the printer 12, paper of A4 size is set in the lower paper tray 28-1; paper of B5 size is set in the upper paper tray 28-2.

The printer transmitting section 84 transmits paper tray information formed from paper size information of the paper tray section 28 to the personal computer 11 as a paper size transmitting section.

The mechanism section 79, as shown by FIG. 2, includes an image forming section 34, a paper feeding section 85, a paper tray section 28 and a paper size detecting section 86.

The image forming section 34 forms an image onto the paper on the basis of image data received from the mechanism controlling section 80.

The paper feeding section 85 performs a paper feeding from the paper tray section 28 to the image forming section 34 on the basis of the tray designation information received from the mechanism controlling section 80. The paper feeding section 85 judges that a paper feeding source tray is any one of the lower paper tray 28-1 and the upper paper tray 28-2 on the basis of the tray designation information, rotates and drives respective rollers in order to feed paper from the paper feeding source tray to the image forming section 34.

The paper size detecting section 86 contains optics sensors 31-1 and 31-2 (FIG. 8), and obtains guide position information by respectively detecting the position of the paper guide 29 (FIG. 9) in respective paper tray of the paper tray section 28 on the basis of a detection instruction from the mechanism controlling section 80. The paper size detecting section 86 transmits the obtained guide position information to the mechanism controlling section 80.

Continuously, it is to explain an operation of the printer system 10 of the present embodiment.

Figure 12:
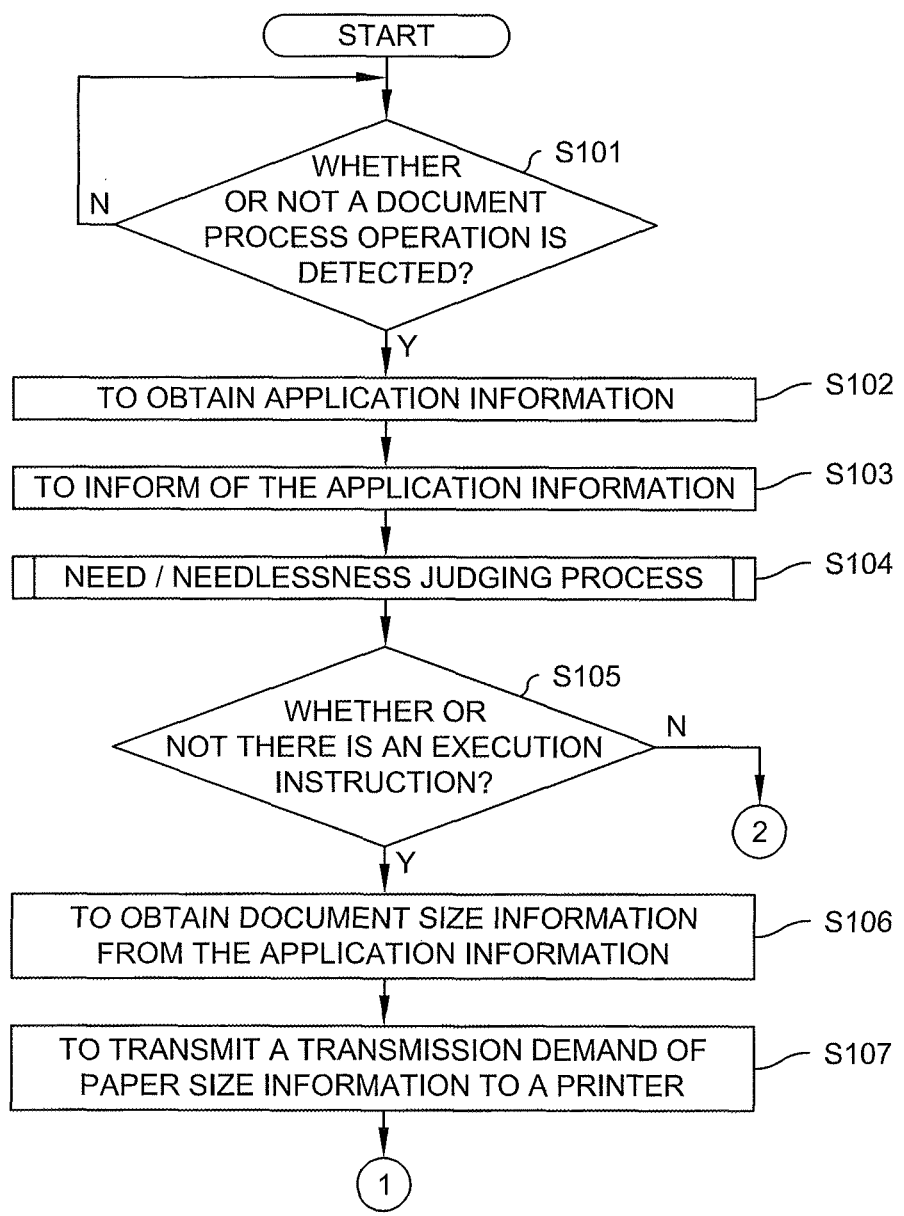
FIG. 12 a first flow chart for explaining an inquiry control operation of a personal computer in embodiment 1 of the present invention.
Figure 13:
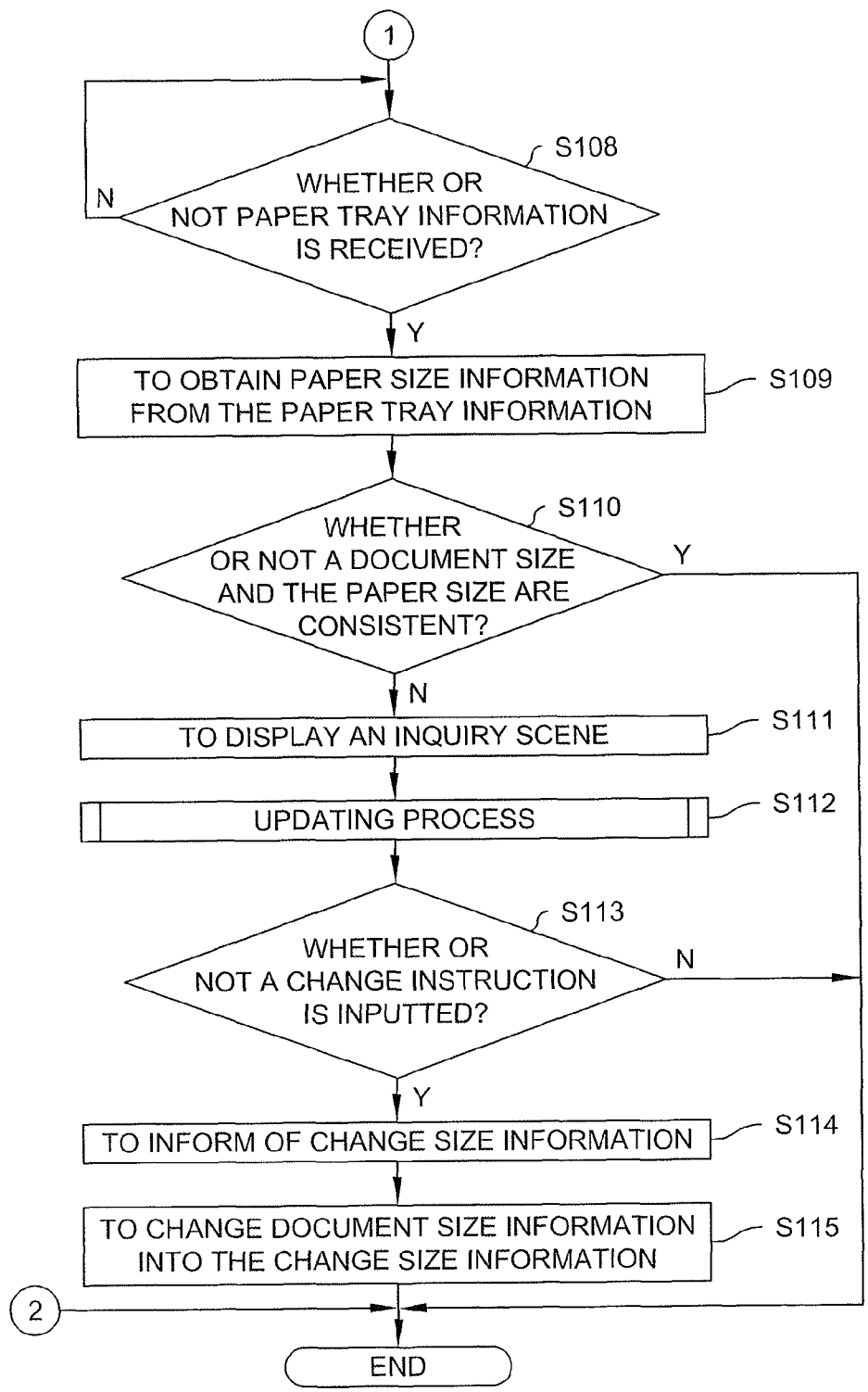
FIG. 13 a second flow chart for explaining an inquiry control operation of a personal computer in embodiment 1 of the present invention.

Firstly, it is to explain operation of the personal computer 11 in the case that a document process operation is detected through the operation detecting section 59 by using flow charts shown by FIG. 12 and FIG. 13.

FIG. 12 is a first flow chart for explaining an inquiry control operation in embodiment 1 of a personal computer of the present invention; and FIG. 13 is a second flow chart for explaining an inquiry control operation in embodiment 1 of a personal computer of the present invention.

In the document process application section 51, the operation detecting section 59 of the application watching section 56 performs communication with the edition processing section 55, after detected an operation of any one of a document file open operation, a new document creation operation, a paper setting change operation, a document selection operation and a window activation operation, that is, a document process operation (Step S101), performs an obtainment instruction to the application information obtaining section 60; and notifies of a detection operation name.

The application information obtaining section 60 obtains application information from the edition processing section 55 on the basis of the obtainment instruction from the operation detecting section 59 (Step S102). The application information obtaining section 60 obtains a process ID, a document name of a process object document and document size information, and generates application information along with a detection operation name informed from the operation detecting section 59. Then, the application information obtaining section 60 notifies the application information notifying section 61 of the application information.

The application information notifying section 61 notifies the inquiring process controlling section 54 of the application information informed from the application information obtaining section 60 (Step S103).

After the application information is informed from the document process application section 51, the judging section 70 of the inquiring process controlling section 54 performs a need/needlessness judgment about whether or not a comparing and judging process of document size of the process object document and paper size of paper set in the printer 12 is executed (Step S104). It is to explain about details of the need/needlessness judging process in the judging section 70 by using FIG. 14.

Figure 14:
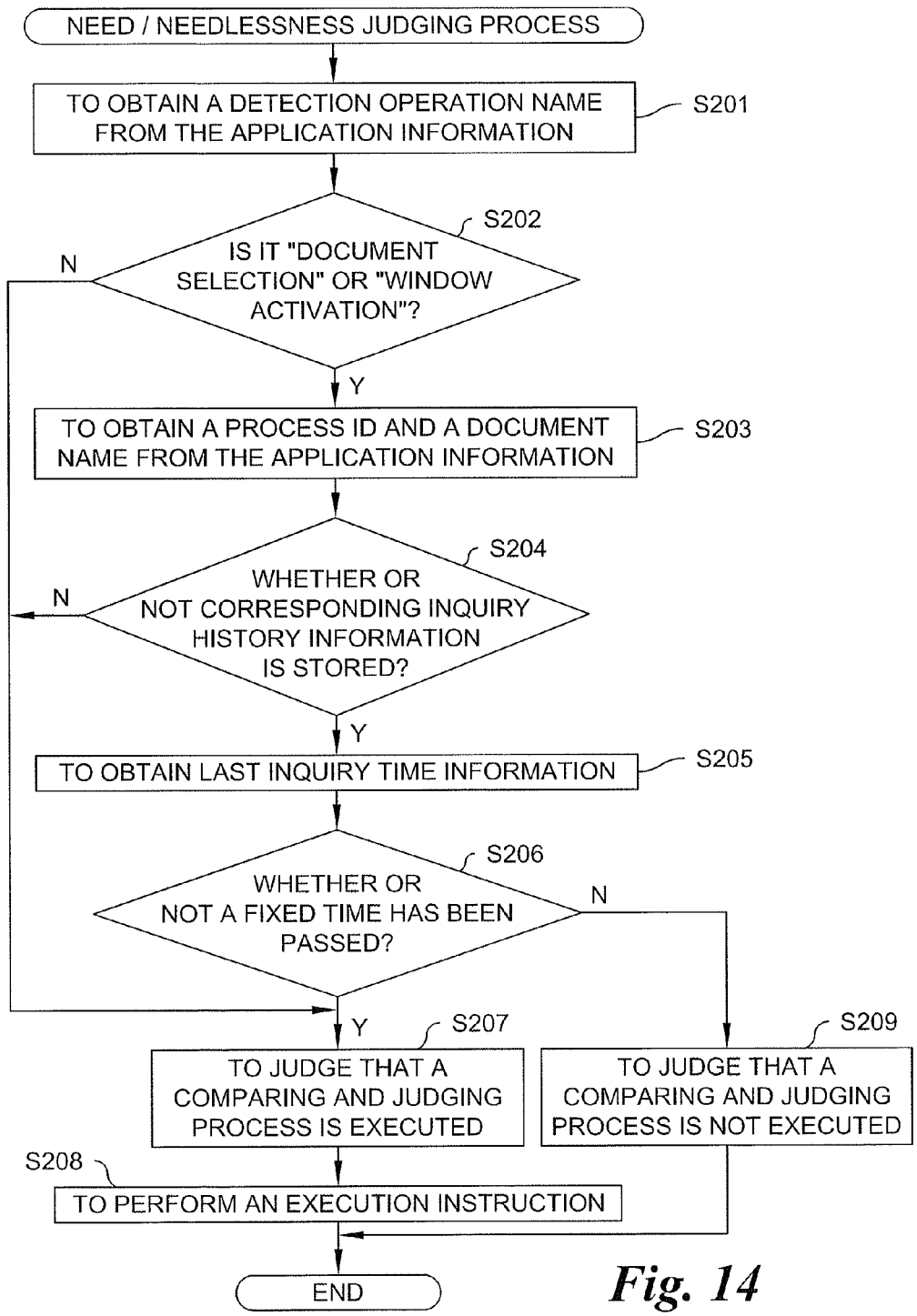
FIG. 14 is a flow chart for explaining a need/needlessness judgment operation of a personal computer of the present invention.

FIG. 14 is a flow chart for explaining need/needlessness judgment operation of personal computer of the present invention.

In the personal computer 11, after application information is informed from the document process application section 51 to the inquiring process controlling section 54, the judging section 70 firstly obtains a detection operation name from the informed application information (Step S201). The judging section 70 obtains any one of "document file open", "new document creation", "paper setting change", "document selection" and "window activation" as the detection operation name.

Next, the judging section 70 judges whether or not the obtained detection operation name is any one of "document selection" and "window activation" (Step S202).

When the detection operation name is not any one of "document selection" and "window activation", but any one of "document file open", "new document creation" and "paper setting change" (Step S202), the judging section 70 judges that the comparing and judging process is executed (Step S207), and performs an execution instruction to the executing section 72 (Step S208).

When the detection operation name is any one of "document selection" and "window activation", the judging section 70 further obtains a process ID and a document name from the application information (Step S203). The judging section 70 obtains, for example, process ID "4712" and document name "specifications.doc" from the application information.

Continuously, the judging section 70 refers to the storing section 71, and judges whether or not inquiry history information corresponding to the obtained process ID and the obtained document name is stored (Step S204).

In the storing section 71 shown by FIG. 7, the process ID "4712" and the document name "specifications.doc" are stored. At this time, the judging section 70 judges that the corresponding inquiry history information is stored (Step S204), and obtains last inquiry time information (Step S205). The judging section 70 obtains the last inquiry time information "2008/08/13 10:14:42" corresponding to the process ID "4712" and the document name "specifications.doc" from the storing section 71.

Further, the judging section 70 obtains present time information representing a time of present. Then, the judging section 70 judges whether or not a fixed time has been passed from a time in which the inquiring section 75 executes the last time inquiring process on the basis of the obtained last inquiry time information and the obtained present time information (Step S206).

After it is judged that the fixed time has been passed (Step S206), the judging section 70 judges that the comparing and judging process is executed (Step S207), and performs an execution instruction to the executing section 72 (Step S208). Thus, the need/needlessness judging process is completed in the personal computer 11.

In the step 206, when it is judged that the fixed time has not been passed, the judging section 70 judges that the comparing and judging process is not executed (Step S209). Thus, the need/needlessness judging process is completed in the personal computer 11.

Further, in the step 204, when inquiry history information corresponding to the obtained process ID and the obtained document name is not stored in the storing section 71, the judging section 70 judges that the comparing and judging process is executed (Step S207), and performs the execution instruction to the executing section 72 (Step S208). Thus, the need/needlessness judging process is completed in the personal computer 11.

As stated above, after the document process operation is detected and the inquiring process with respect to the same process is executed, the comparing and judging process of document size and paper size is executed excluding when the fixed time has not been passed.

Returning to FIG. 12, after the need/needlessness judging process is executed by the judging section 70 (Step S104), and the execution instruction is performed (Step S105), the executing section 72 performs an obtainment instruction to the document size obtaining section 73 and the paper size watching section 52 in order to obtain document size information and paper size information.

The document size obtaining section 73 obtains document size information from the application information received from the document process application section 51 on the basis of the obtainment instruction, and notifies the executing section of it (Step S106). The document size obtaining section 73 obtains, for example, document size information "letter", and notifies the executing section 72 of it.

Further, the demand transmitting section 62 of the paper size watching section 52 transmits the printer 12 of a transmission demand of paper size information on the basis of the obtainment instruction from the inquiring process controlling section 54 (Step S107). At this time, the demand transmitting section 62 notifies the paper size receiving section 63 of the obtainment demand source information representing that the obtainment demand source is the inquiring process controlling section 54.

Then, after the paper tray information is received from the printer 12 (Step S108), the paper size receiving section 63 obtains paper size information from the paper tray information (Step S109). For example, after the paper tray information shown by FIG. 11 is received, the paper size receiving section 63 notifies the inquiring process controlling section 54 of the obtained paper size information on the basis of the obtainment demand source information.

Next, the executing section 72 transmits the document size information informed from the document size obtaining section 73 and the paper size information informed from paper size watching section 52 to the comparing and judging section 74. Then, the comparing and judging section 74 compares the document size information and the paper size information, and judges whether or not they are consistent (Step S110).

When the document size information and the paper size information are consistent, the comparing and judging section 74 judges that paper of the paper size that is consistent with the document size is set in any one of paper tray of the printer 12. Thus, the inquiry controlling process is completed in the personal computer 11.

When the document size information is "letter", and the paper size information includes "A4" and "B5", the comparing and judging section 74 judges that the document size information and the paper size information are not consistent, that is, inconsistent (Step S110). Then, the comparing and judging section 74 notifies the executing section 72 of the judgment result representing inconsistency.

Continuously, the executing section 72, with respect to the inquiring section 75, notifies of the document size information and the paper size information, and performs an inquiry instruction.

The inquiring section 75, after received the inquiry instruction from the executing section 72, displays an inquiry scene 40 on the display 27 in order to inquire a user whether or not document size of process object document is changed into the paper size of paper set in the printer 12 (Step S111). On the display 27, on the basis of a control of the inquiring section 75, as shown by FIG. 6, a balloon window of the inquiry scene 40 is displayed in the neighborhood of the task bar 39.

Further, the executing section 72, with respect to the updating section 78, notifies of a process ID and a document name, and performs an updating instruction of the storing section 71. On the basis of the updating instruction, the updating section 78 updates the storing section 71 (Step S112). It is to explain details of an updating process of the storing section 71 through the updating section 78 by using FIG. 15.

Figure 15:
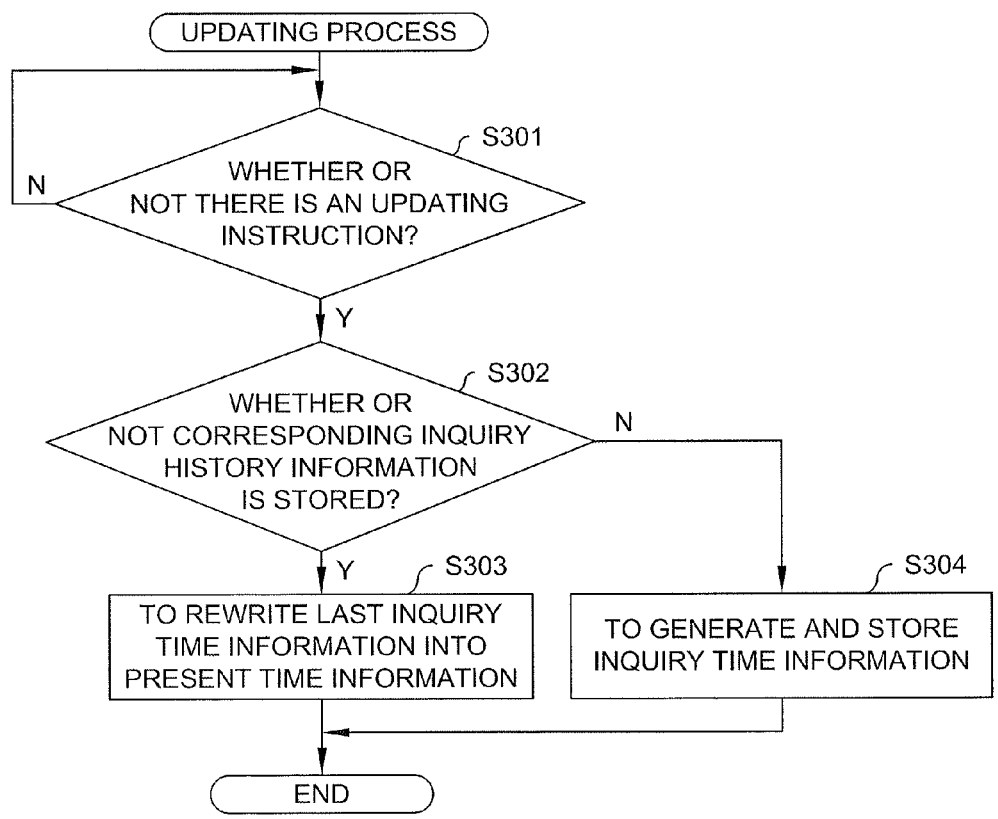
FIG. 15 is a flow chart for explaining an updating operation of a personal computer of the present invention.

FIG. 15 is a flow chart for explaining an updating operation of a personal computer of the present invention.

In the personal computer 11, after the executing section 72, with respect to the updating section 78, notifies of the process ID and the document name notifies of process ID and document name and performs an updating instruction of the storing section 71 (Step S301), the updating section 78 firstly judges whether or not inquiry history information corresponding to the informed process ID and the informed document name is stored in the storing section 71 in order to update the storing section 71 on the basis of the updating instruction (Step S302).

For example, after the process ID "4712" and the document name "specifications.doc" are informed, the updating section 78 judges that inquiry history information corresponding to the storing section 71 (FIG. 7) is stored (Step S302). Continuously, the updating section 78 obtains present time information, and rewrites the last inquiry time information "2008/08/13 10:14:42" corresponding to the process ID "4712" and the document name "specifications.doc" into the obtained present time information (Step S303). Thus, the updating process is completed in the personal computer 11.

When the inquiry history information corresponding to the process ID and the document name is not stored in the storing section 71 (Step S302), the updating section 78 obtains present time information, newly creates inquiry history information on the basis of the informed process ID, the informed document name and the obtained present time information, and stores the inquiry history information in the storing section 71 (Step S304). Thus, the updating process is completed in the personal computer 11.

As stated above, after the inquiring process is executed, inquiry history information representing an execution history is updated.

Returning to FIG. 13, on the inquiry scene 40 displayed on the display 27, as shown by FIG. 6, the selection buttons 42a and 42b for changing document size into paper size are provided. Respective selection buttons 42a and 42b respectively correspond to the lower paper tray 28-1 and the upper paper tray 28-2 of the printer 12. That is, the selection button 42a corresponds to a change from document size information "letter" to paper size information "A4"; and the selection button 42b corresponds to a change from document size information "letter" to paper size information "B5".

On the display of the inquiry scene 40, when a user selects a button 40 by operating the inputting apparatus 26, or any one of button is not selected even if a fixed time is passed, the inquiring section 75 stops the display of the inquiry scene 40 on the basis of an instruction from the executing section 72. That is, on the display 27, the balloon window of the inquiry scene 40 is closed. Thus, the inquiry controlling process is completed in the personal computer 11.

After the document size is changed, the user operates the inputting apparatus 26 on the display of the inquiry scene 40, and selects any one of the selection buttons 42a and 42b. On the basis of the selection, the inputting section 76 inputs the change instruction of document size and tray designation information (Step S113). For example, when the selection button 42a is selected, the inputting section 76 inputs the change instruction and tray designation information designating the lower paper tray 28-1.

After the change instruction and the tray designation information are inputted, the executing section 72 notifies the changing section 77 of paper size information corresponding to the inputted tray designation information as change size information (Step S114). For example, the executing section 72 notifies the changing section 77 of change size information "A4". Then, the changing section 77 transmits the change demand and the change size information to the document process application section 51.

After the document process application section 51 received the change demand and the change size information from the inquiring process controlling section 54, the setting section 58, with respect to the process object document in the document process through the edition processing section 55, changes setting of the document size information into the change size information (Step S115). Thus, the inquiry controlling process is completed in the personal computer 11.

As stated above, when the document size of the process object document in the document process is not consistent with the paper size of paper set in the printer 12, the inquiring process is executed that inquires a user whether or not document size is made to be consistent with the paper size.

Figure 16:
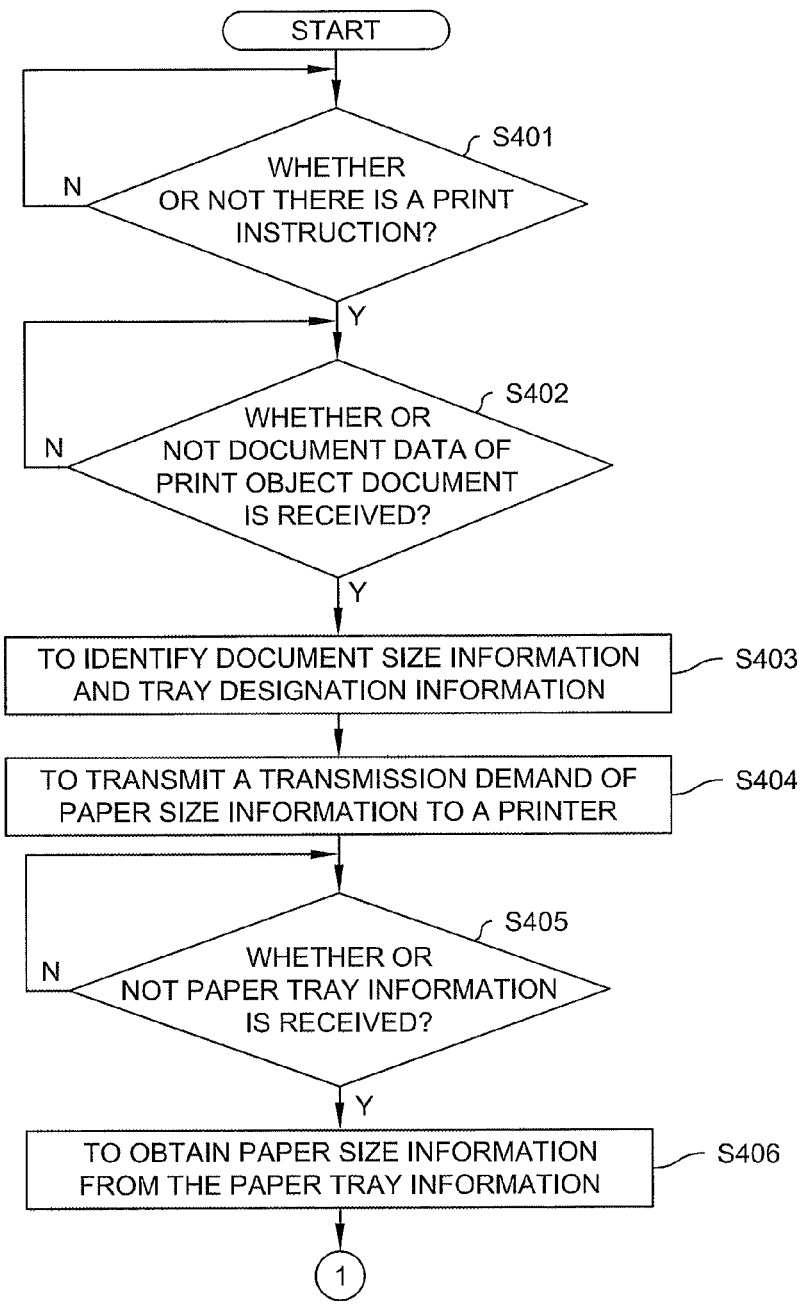
FIG. 16 is a first flow chart for explaining a print instruction operation of a personal computer of the present invention.
Figure 17:
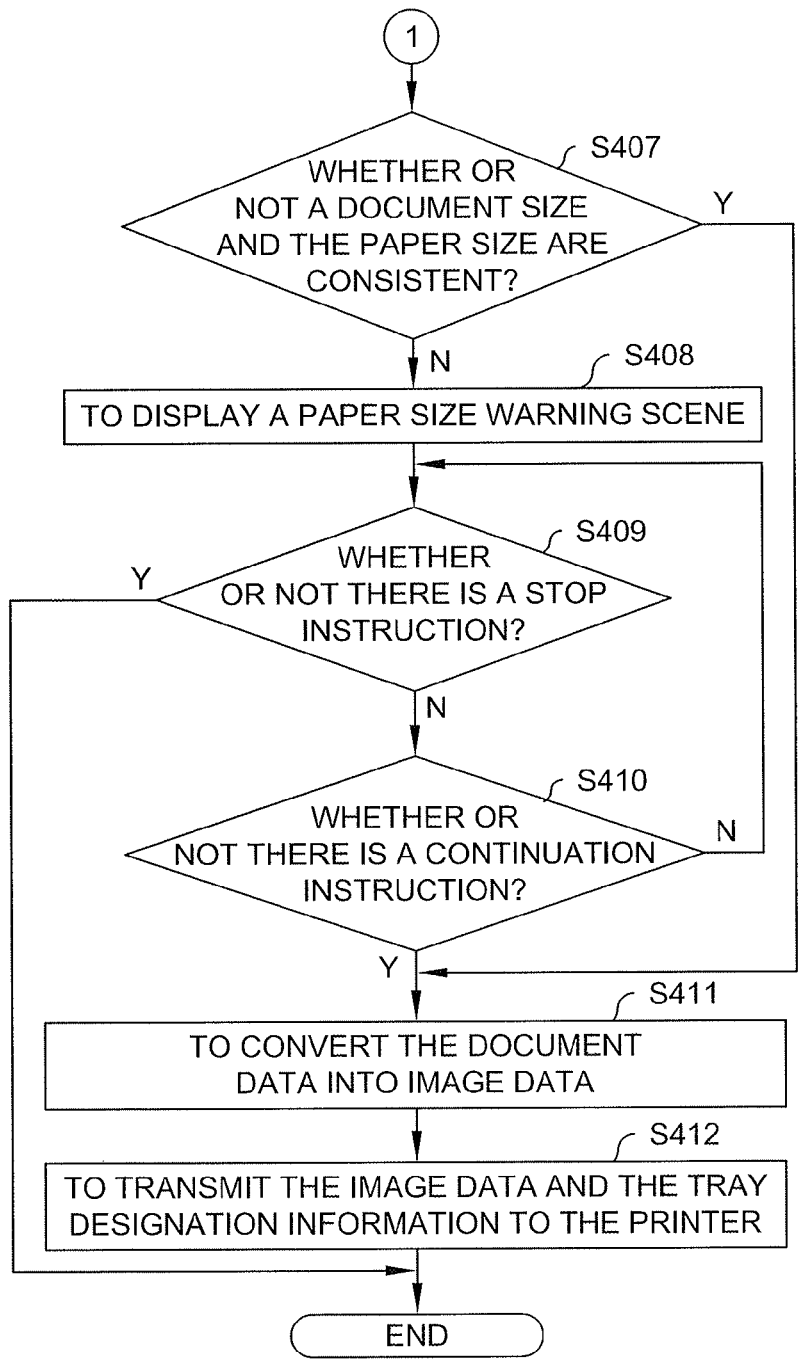
FIG. 17 is a second flow chart for explaining a print instruction operation of a personal computer of the present invention.

Next, it is to explain an operation of the personal computer 11 when a print instruction is performed through the instructing section 57 by using flow charts shown by FIG. 16 and FIG. 17.

FIG. 16 is a first flow chart for explaining a print instruction operation of a personal computer of the present invention; and FIG. 17 is a second flow chart for explaining a print instruction operation of a personal computer of the present invention.

In the document process application section 51, after the instructing section 57 performs the print instruction in the edition processing section 55 (Step S401), the edition processing section 55 regards a process object document in the document process as a print object document, and transmits document data of the print object document to the image forming section 53.

In the image forming section 53, after the document data is received (Step S402), the identifying section 65 identifies document size information and tray designation information in which the received document data is contained (Step S403). The identifying section 65 identifies, for example, document size information "letter" and tray designation information "automatic selection". Then, the identifying section 65 notifies the paper size judging section 66 of the identified document size information and the identified tray designation information.

Further, the reception detecting section 64 detects a receiving of the document data, and performs an obtainment instruction of paper size information to the paper size watching section 52.

In the paper size watching section 52, the demand transmitting section 62 transmits a transmission instruction of paper size information to the printer 12 on the basis of the obtainment instruction from the image forming section 53 (Step S404). Further, the demand transmitting section 62 notifies the paper size receiving section 63 of the obtainment demand source information representing that the obtainment demand source is the image forming section 53.

Then, after paper tray information (FIG. 11) is received from the printer 12 (Step S405), the paper size receiving section 63 obtains paper size information corresponding to respective tray designation information from paper tray information (Step S406), and notifies the image forming section 53 of the paper size information on the basis of the obtainment demand source information. The paper size receiving section 63 obtains, for example, paper size information "A4" corresponding to tray designation information "lower paper tray", and obtains paper size information "B5" corresponding to tray designation information "upper paper tray", and then notifies the image forming section 53 of them.

Continuously, the paper size judging section 66 judges whether or not document size of a print object document and paper size of paper feeding source tray are consistent (Step S407). The paper size judging section 66 compares document size information informed from the identifying section 65 and paper size information corresponding to tray designation information informed from the identifying section 65 in respective paper size information informed from the paper size watching section 52, and then judges whether or not they are consistent. Further, when "automatic selection" is informed as tray designation information, the paper size judging section 66 respectively compares document size information and respective paper size information, and then judges whether or not they are consistent.

For example, after document size information "letter" and tray designation information "automatic selection" are identified, and paper size information "A4" and "B5" are informed, the paper size judging section 66 judges that the document size information and the paper size information are not consistent, that is, inconsistent (Step S407). Then, the paper size judging section 66, with respect to the notifying section 67, notifies of the document size information and the paper size information; and performs a notification instruction.

The notifying section 67 displays the paper size warning scene 37 (FIG. 5) containing the document size information and the paper size information on the display 27 on the basis of the notification instruction from the paper size judging section 66 (Step S408).

On the display of the paper size warning scene 37, after user selects a "stop" selection button 38a by operating the inputting apparatus 26, the inputting section 68 inputs a stop instruction (Step S409). Thus, the print instructing process is completed in the personal computer 11.

On the paper size warning scene 37, after a "print" selection button 38b is selected, the inputting section 68 inputs a continuation instruction (Step S410). On the basis of the continuation instruction, the converting section 69 converts the document data received from the document process application section 51 into image data for print (Step S411).

Continuously, the converting section 69 transmits the converted image data and the tray designation information identified by the identifying section 65 to the printer 12 (Step S412). Thus, the print instructing process is completed in the personal computer 11.

In the Step S407, after it is judged that the document size information and the paper size information are consistent, the paper size judging section 66 performs a convert instruction in the converting section 69. On the basis of the convert instruction, the converting section 69 converts document data into image data (Step S411), and transmits the image data and tray designation information to the printer 12 (Step S412). Thus, the print instructing process is completed in the personal computer 11.

As stated above, when document size of a print object document and paper size of paper feeding source tray are not consistent, a paper size warning scene is displayed on the display 27 in order to make a user select a print stop or a print continuation.

Figure 18:
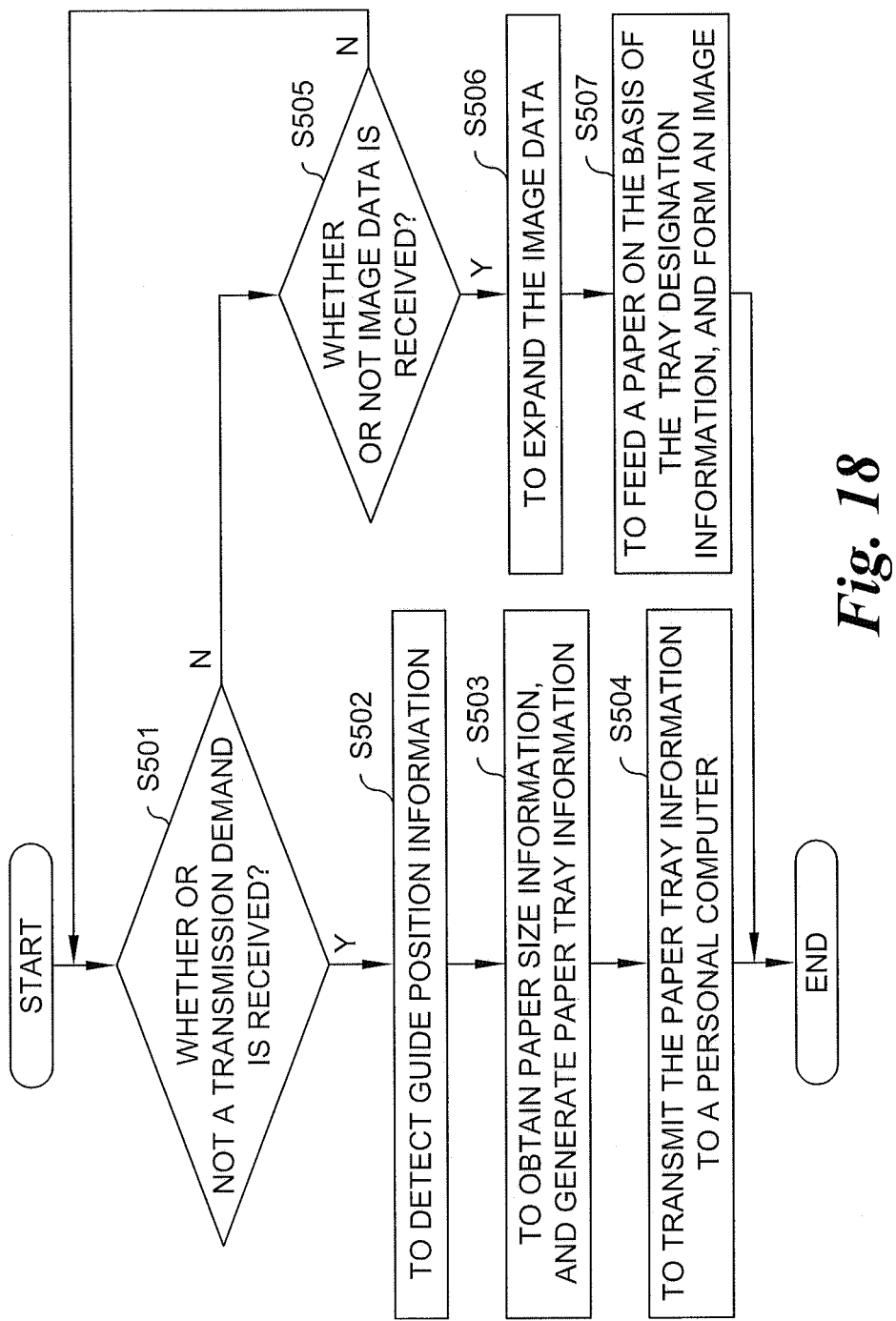
FIG. 18 is a flow chart for explaining an operation of a printer in embodiment 1.

Next, it is to explain an operation of the printer 12 by using a flow chart shown by FIG. 18.

FIG. 18 is a flow chart for explaining an operation of a printer in embodiment 1.

Firstly, it is to explain an operation of the printer 12 in the case to receive a transmission demand of paper size information from the personal computer 11 by following FIG. 18. Moreover, in the paper tray section 28 of the printer 12, paper of A4 size is accommodated in the lower paper tray 28-1; and paper of B5 size is accommodated in the upper paper tray 28-2.

In the printer 12, after the printer transmitting section 81 received a transmission demand from the personal computer 11 (Step S501), the transmission demand is sent to the paper size obtaining section 83.

Then, the paper size obtaining section 83 performs a detection instruction in the mechanism section 79 on the basis of the transmission demand.

In the mechanism section 79, the paper size detecting section 86 respectively detects positions of the paper guides 29 (FIG. 9) in the lower paper tray 28-1 and the upper paper tray 28-2 through the optics sensors 31-1 and 31-2 on the basis of the detection instruction from the mechanism controlling section 80, and obtains respective guide position information (Step S502). The paper size detecting section 86 transmits the obtained guide position information to the mechanism controlling section 80.

Continuously, the paper size obtaining section 83 obtains paper size information corresponding to respective paper trays on the basis of respective guide position information received from the mechanism section 79, and generates paper tray information (Step S503). The paper size obtaining section 83 obtains paper size information "A4" corresponding to the lower paper tray 28-1, obtains paper size information "B5" corresponding to the upper paper tray 28-2, as shown by FIG. 11, and generates paper tray information. The generated paper tray information is sent to the printer transmitting section 84.

Then, the printer transmitting section 84 transmits the paper tray information containing the paper size information to the personal computer 11 (Step S504). Thus, the obtaining and transmitting process of paper size information is completed in the printer 12.

As stated above, after positions of the paper guides 29 of respective paper trays are detected, and paper size information is obtained, paper tray information containing the paper size information is generated, and is sent to the personal computer 11.

Next, it is to explain an operation of the printer 12 in the case to receive image data for print from the personal computer 11 by following FIG. 18.

In the printer 12, after the printer transmitting section 81 received image data and tray designation information from the personal computer 11 (Step S505), the image data and the tray designation information are sent to the data expanding section 82.

Continuously, the data expanding section 82 performs an expanding process of the image data (Step S506). The data expanding section 82 transmits the expanded image data and the tray designation information to the mechanism section 79.

In the mechanism section 79, the paper feeding section 85 receives tray designation information from the mechanism controlling section 80, selects any one of the lower paper tray 28-1 and the upper paper tray 28-2 as a paper feeding source tray on the basis of the tray designation information, and then feed a paper from the paper feeding source tray of the paper tray section 28 to the image forming section 34. Then, the image forming section 34 forms an image onto the fed paper on the basis of the image data received from the mechanism controlling section 80 (Step S507). Thus, the printing process is completed in the printer 12.

As stated above, on the basis of the image data received from the personal computer 11, an image is formed onto the paper.

Figure 19:
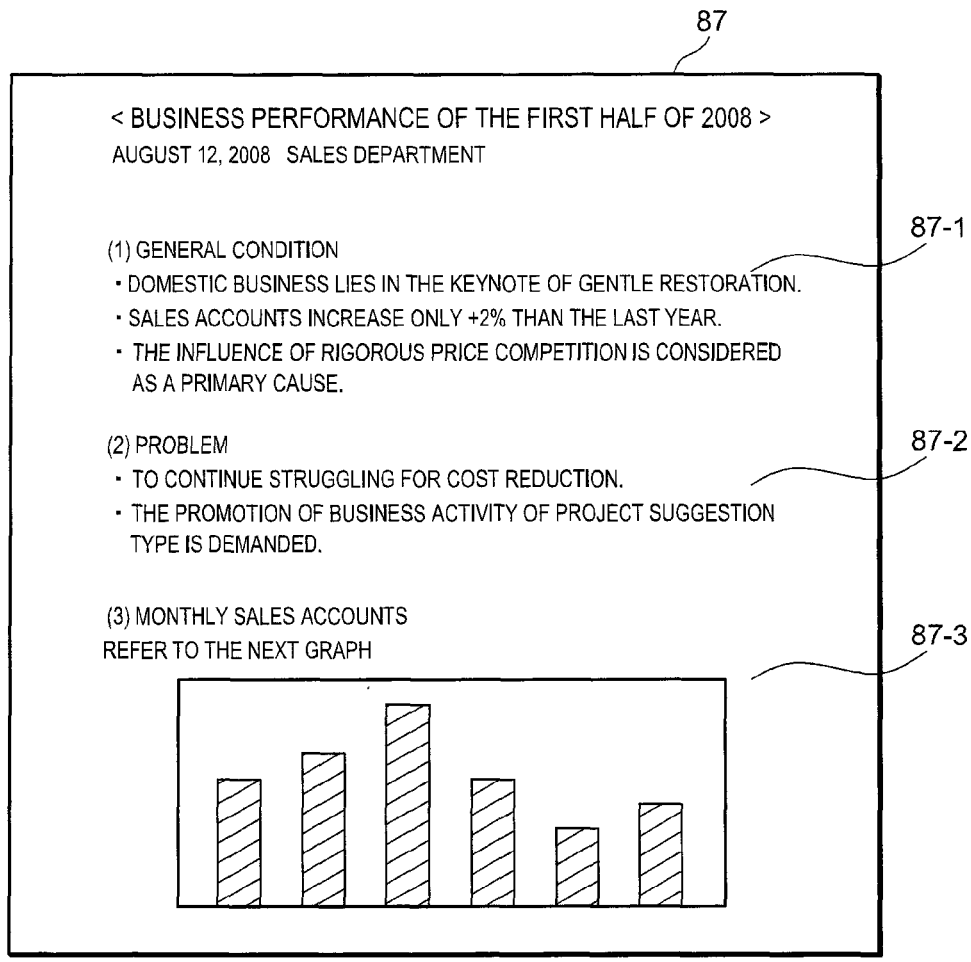
FIG. 19 is a diagram showing an example of process object document.

FIG. 19 is a diagram showing an example of a process object document.

A process object document 87 shown by FIG. 19 includes text parts 87-1, 87-2, graph part 87-3 and the like. Here, the process object document 87 is layout adjusted in order that document size becomes letter size.

In the printer system containing a former personal computer, when paper of letter size is not set in the printer, if a print of the process object document 87 shown by FIG. 19 is instructed, the personal computer changes, on the basis of an instruction from a user, for example, document size into paper size of the printer from letter size, and then is made to execute the print. The print result is shown by FIG. 28 in the case to execute the print by changing document size into A4 size from letter size.

Figure 28:
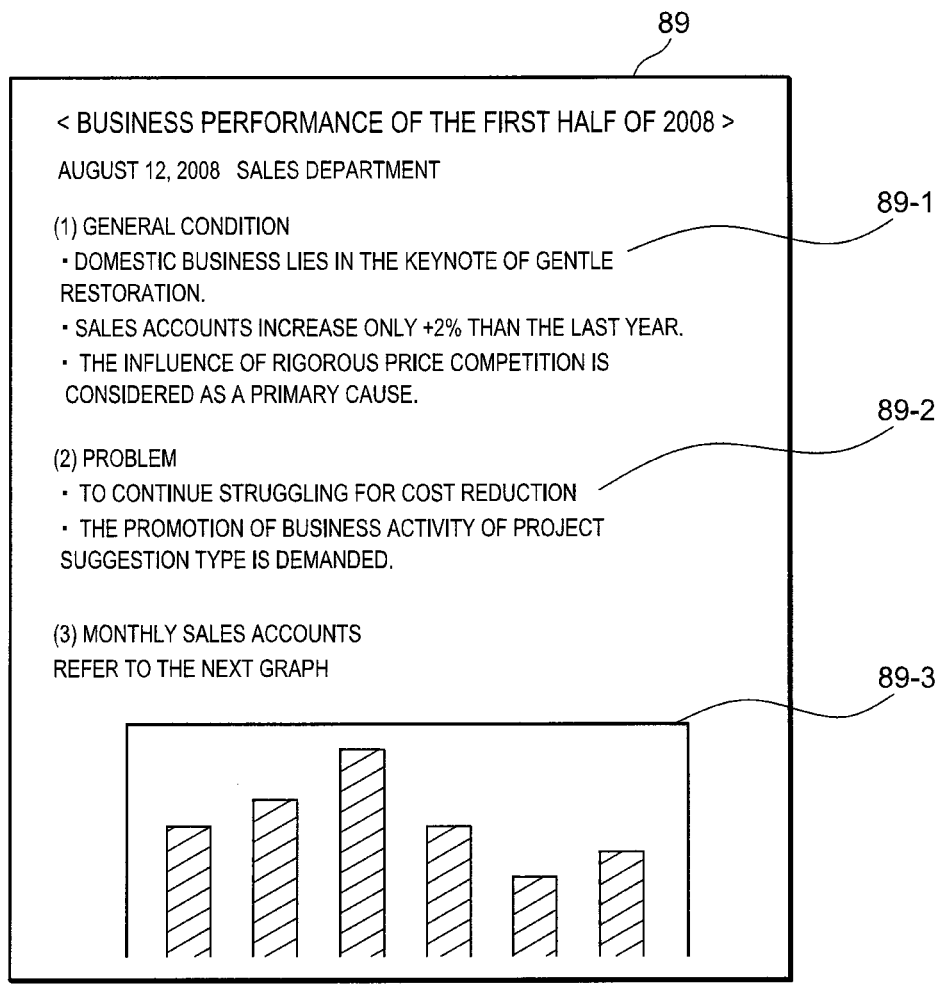
FIG. 28 is a diagram showing an example of a related print result.

FIG. 28 is a diagram showing an example of a related print result.

Because size of width direction of paper of A4 size is small comparing with paper of letter size, so one part of text parts 87-1, 87-2 contained in the process object document 87 of letter size (FIG. 19) extends over a plurality of lines in a print result 89 of A4 size, as shown by FIG. 28. At this time, layout of text parts 89-1, 89-2 and graph part 89-3 falls into disorder, and then failure print is performed.

Figure 20:
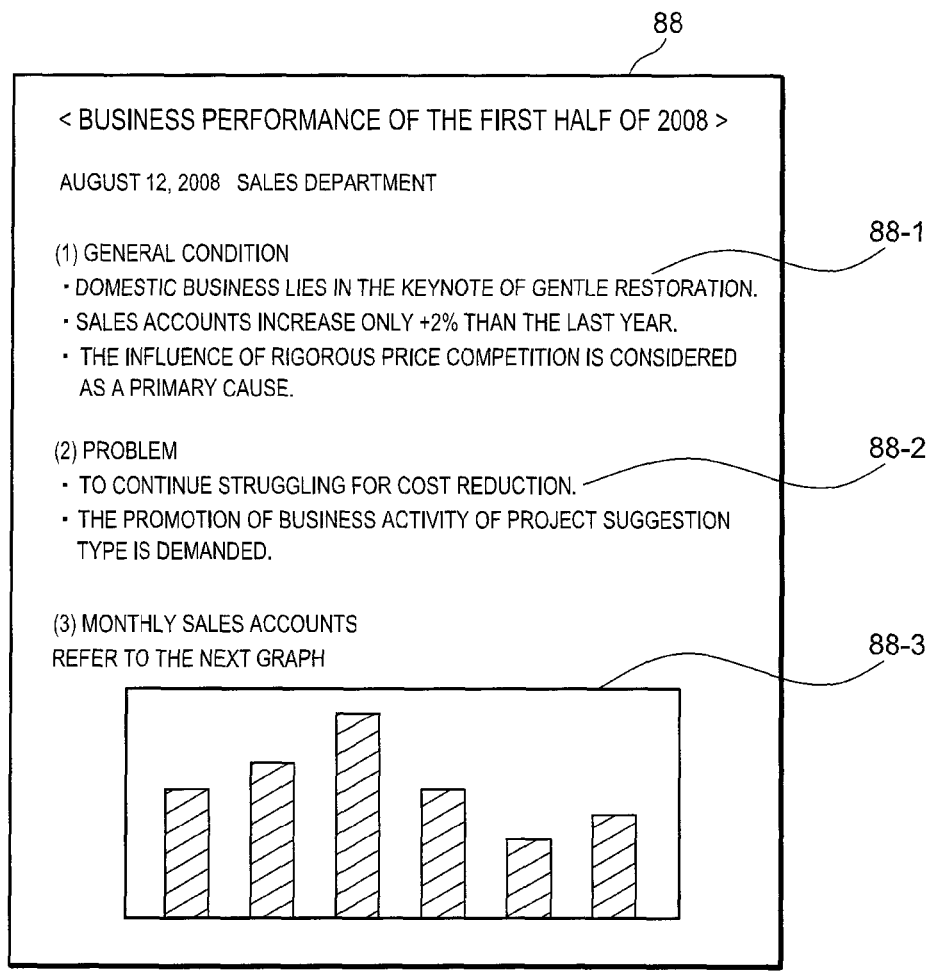
FIG. 20 is a diagram showing an example of a print result.

On the other hand, in the printer system 10 of the present embodiment, document size of the process object document 87 (FIG. 19) is changed from letter into A4, and then the print result is shown by FIG. 20 in the case to execute the print.

FIG. 20 is a diagram showing an example of a print result in the embodiment 1.

According to the personal computer 11 of the present embodiment, because a change of document size is executed in the document process through the document process application section 51, for example, after character size of texts contained in the text parts 89-1, 89-2 of the process object document 87 (FIG. 19) is changed, through instructing to print, it is possible to obtain a print result 88 containing text parts 881, 882 and a graph part 88-3 as shown by FIG. 20.

As stated above, the personal computer 11 of the present embodiment, after detected an operation of the document process application section 51, executes a comparing and judging process of process object document size and paper size of paper set in the printer 12. Then, when paper of the same size as the document size is not set in the printer 12, a user is inquired whether or not document size is changed, document size is changed into paper size in the printer 12 on the basis of the instruction from user. Therefore it is possible to restrain the occurrence of failure print caused by inconsistency between document size and paper size. Because the comparing and judging process is executed before the print instruction, so even when document size is changed, and the layout of the process object document falls into disorder, it is possible for a user to confirm; and because it is possible to amend through the document process application section 51, so a restraint effect of the failure print is improved.

Further, in the personal computer 11 of the present embodiment, because it is possible to prevent repeating to execute inquiring processes with respect to the same process object document in a short time by setting a storing section for storing history information of inquiring processes, so unnecessary process cost is reduced, and then the convenience is improved.

Moreover, in the present embodiment, the application watching section 56 is explained as a plug-in that operates in the inside of a process of the document process application section 51. However, the present invention is not limited in the case. For example, it is possible to obtain a form of outside program that performs an operation detection through watching access operations to document file.

Embodiment 2

Figure 21:
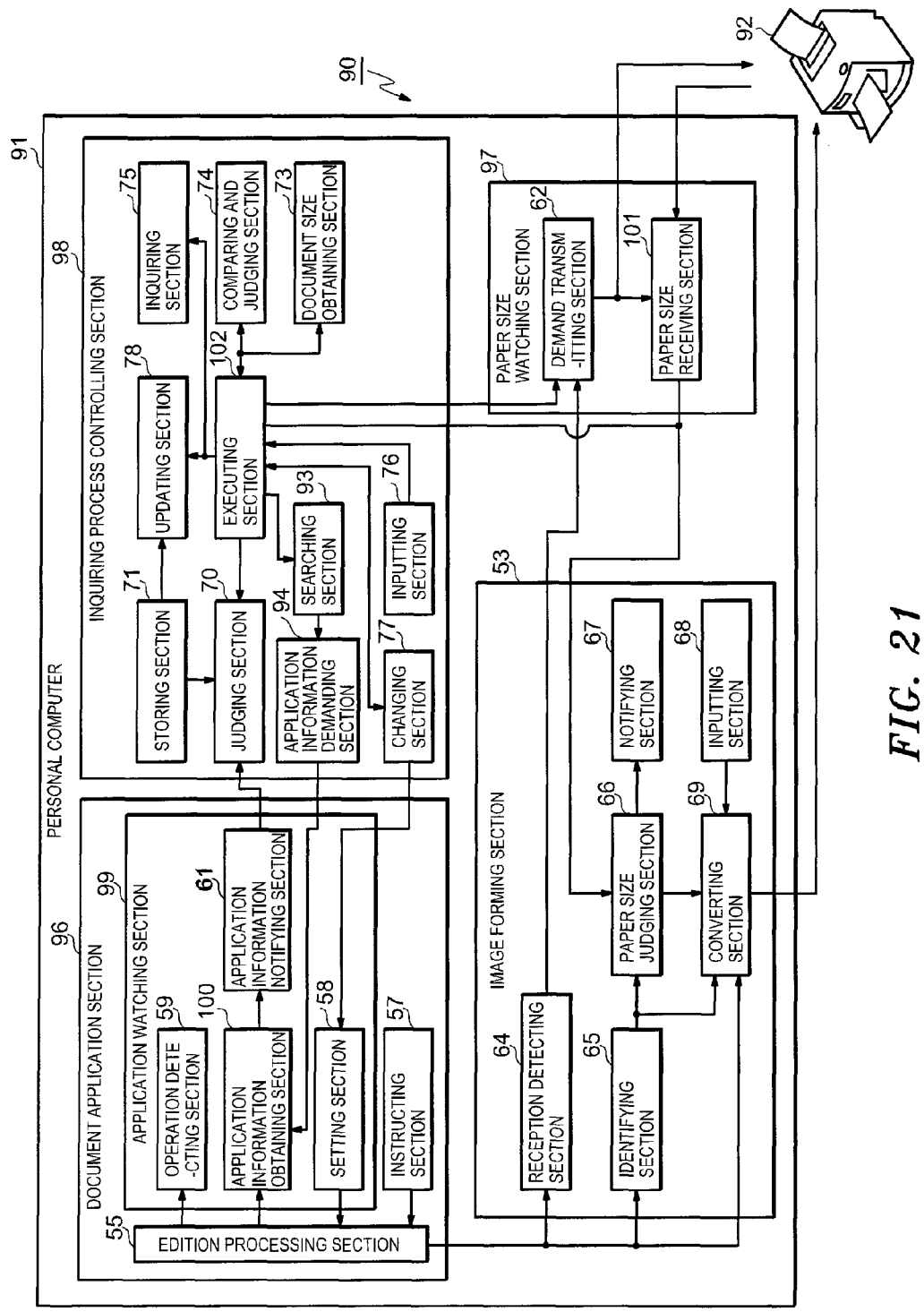
FIG. 21 is a block diagram showing a function structure of a personal computer in embodiment 2 of the present invention.
Figure 22:
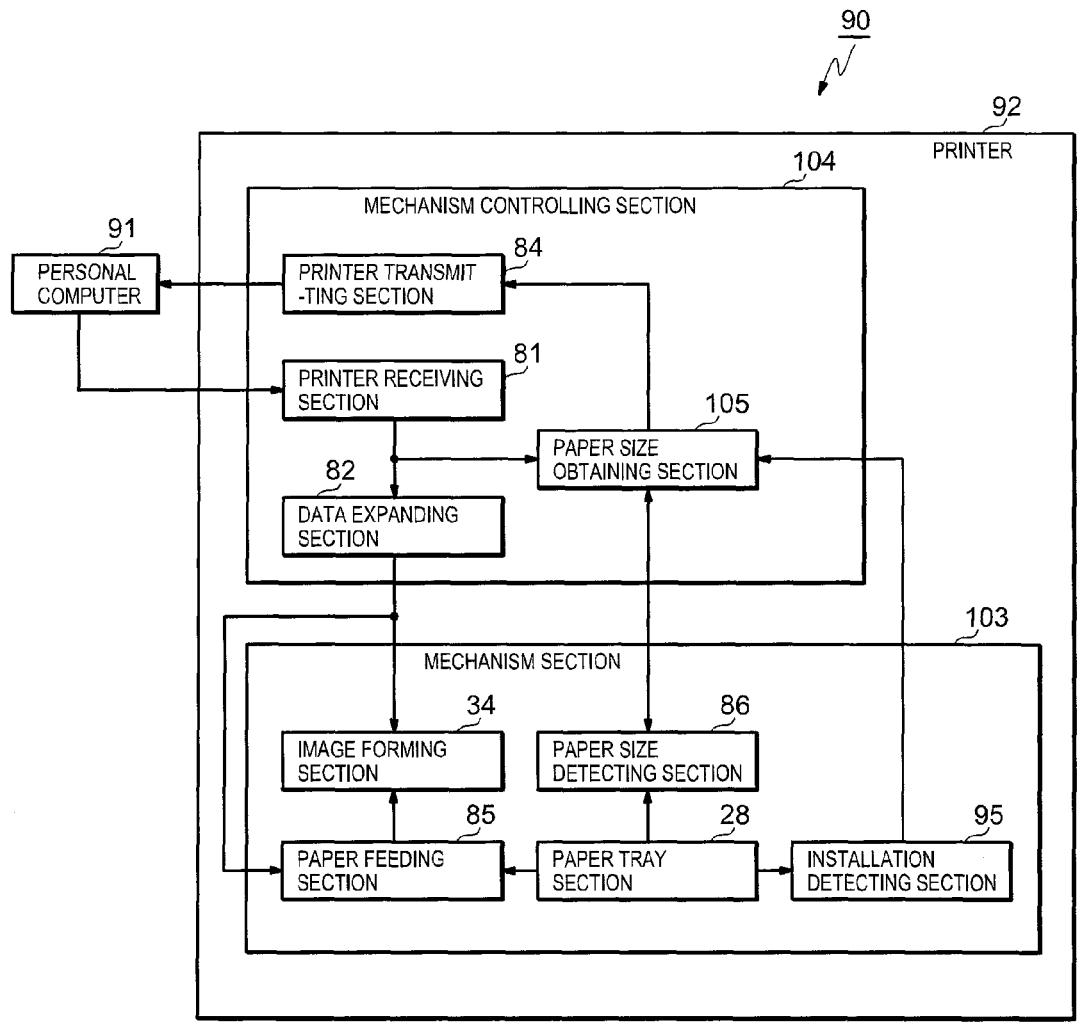
FIG. 22 is a block diagram showing a function structure of a printer in embodiment 2.

FIG. 21 is a block diagram showing a function structure of a personal computer in embodiment 2 of the present invention; and FIG. 22 is a block diagram showing a function structure of a printer in embodiment 2.

A printer system 90 of the present embodiment is composed of a personal computer 91 and a printer 92. Such structure as a searching section 93 and an application information demanding section 94 are added in the personal computer 91 and such structure as an installation detecting section 95 is added in the printer 92, are different from that of embodiment 1.

Moreover, in the present embodiment, the same structure as the embodiment 1 is shown by the same mark, and the detailed explanations about them are omitted.

The printer 92, as an image forming apparatus, as shown by FIG. 22, comprises a mechanism section 103 and a mechanism controlling section 104.

The mechanism section 103, as shown by FIG. 22, includes an image forming section 34, a paper feeding section 85, a paper tray section 28, a paper size detecting section 86 and an installation detecting section 95.

The installation detecting section 95, after any one of the lower paper tray 28-1 and the upper paper tray 28-2 is drawn out in the paper tray section 28, if it is installed again, detects the installation, and then notifies the mechanism controlling section 104 of it.

The mechanism controlling section 104, as shown by FIG. 22, includes a printer transmitting section 81, a data expanding section 82, a paper size obtaining section 105 and a printer transmitting section 84.

The paper size obtaining section 105 performs a detection instruction to the mechanism section 103 on the basis of a transmission demand from the personal computer 91. Then, the paper size obtaining section 105 receives guide position information from the mechanism section 103, obtains paper size information on the basis of the guide position information, and generate paper tray information as shown by FIG. 11.

Further, the paper size obtaining section 105, after informed of the installation of the paper tray section 28 from the mechanism section 103, performs a detection instruction to the mechanism section 103, obtains paper size information, and generates paper tray information. Then, the paper size obtaining section 105 generates a paper change flag for informing of the installation of the paper tray section 28, that is, a change of paper in the paper tray section 28, and then adds it to paper tray information.

Figure 23:
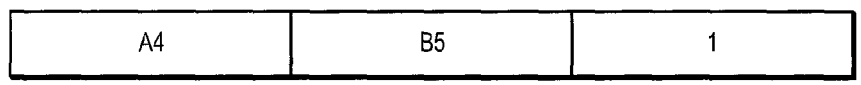
FIG. 23 is a second explanation diagram showing a structure of paper tray information.

FIG. 23 is a second explanation diagram showing a structure of paper tray information.

The paper size obtaining section 105 obtains, for example, "A4" and "B5" as paper size information corresponding to respective paper trays on the basis of the guide position information. Further, the paper size obtaining section 105 generates a paper change flag "1" as installation information representing installation of the paper tray section 28. Then, the paper size obtaining section 105 adds the generated paper change flag "1" to respective obtained paper size information "A4" and "B5", as shown by FIG. 22, and generates paper tray information.

The personal computer 91, as an image processing apparatus, as shown by FIG. 21, includes a document process application section 96, a paper size watching section 97, an image forming section 53 and an inquiring process controlling section 98.

The document process application section 96, as shown by FIG. 21, is composed of an edition processing section 55, an application watching section 99 and an instructing section 57.

The application watching section 99, as shown by FIG. 21, has a setting section 58, an operation detecting section 59, an application information obtaining section 100 and an application information notifying section 61.

The application information obtaining section 100, on the basis of the obtainment instruction, performs communication with the edition processing section 55 and obtains application information. Further, the application information obtaining section 100 obtains application information on the basis of the obtainment instruction from the inquiring process controlling section 98. The application information obtaining section 100 notifies the application information notifying section 61 of the obtained application information.

The paper size watching section 97, as shown by FIG. 21, includes a demand transmitting section 62 and a paper size receiving section 101.

The paper size receiving section 101, as a medium size receiving section and a medium size obtaining section, receives paper tray information from the printer 92 and obtains paper size information. The paper size receiving section 101, when the paper change flag is not added to the received paper tray information, performs a notification of the obtained paper size information on the basis of obtainment demand source information informed from the demand transmitting section 62. Further, the paper size receiving section 101, as a convert detecting section, when the paper change flag is added to the paper tray information, detects a change of paper set in the printer 12, and then notifies the inquiring process controlling section 98 of the paper change information representing the change of paper, and the obtained paper size information.

The inquiring process controlling section 98, as shown by FIG. 21, includes a judging section 70, a storing section 71, an executing section 102, a document size obtaining section 73, a comparing and judging section 74, an inquiring section 75, an inputting section 76, a changing section 77, a updating section 78, a searching section 93 and an application information demanding section 94.

The executing section 102 performs an obtainment instruction to the document size obtaining section 73 and the paper size watching section 52 on the basis of an execution instruction from the judging section 70. Then, the executing section 72 transmits the document size information and the paper size information to the comparing and judging section 74 to execute a comparing and judging process. Further, the executing section 102, on the basis of a judgment result from the comparing and judging section 74, executes an inquiry instruction to the inquiring section 75, an updating instruction to the updating section 78, a notification of change size information to the changing section 77, and the like.

Furthermore, the executing section 102, after received the paper change information and the paper size information from the paper size watching section 97, performs a search instruction to the searching section 93.

The searching section 93 searches respective windows displayed on the display 27, specifies an active window, that is, a window in operation, and obtains a process ID of a program corresponding to the window. The searching section 93 performs an obtainment of the process ID by using an API of OS.

Further, the searching section 93 obtains process information of a program corresponding to the process on the basis of the obtained process ID. The searching section 93 performs an obtainment of process information by using the API of OS. Then, the searching section 93, refers to the obtained process information, and then judges whether or not the process is a process in starting in the document process application section 96.

The application information demanding section 94 performs an obtainment instruction of application information with respect to the document process application section 96.

Next, it is to explain an operation of the printer system 90 of the present embodiment.

Figure 24:
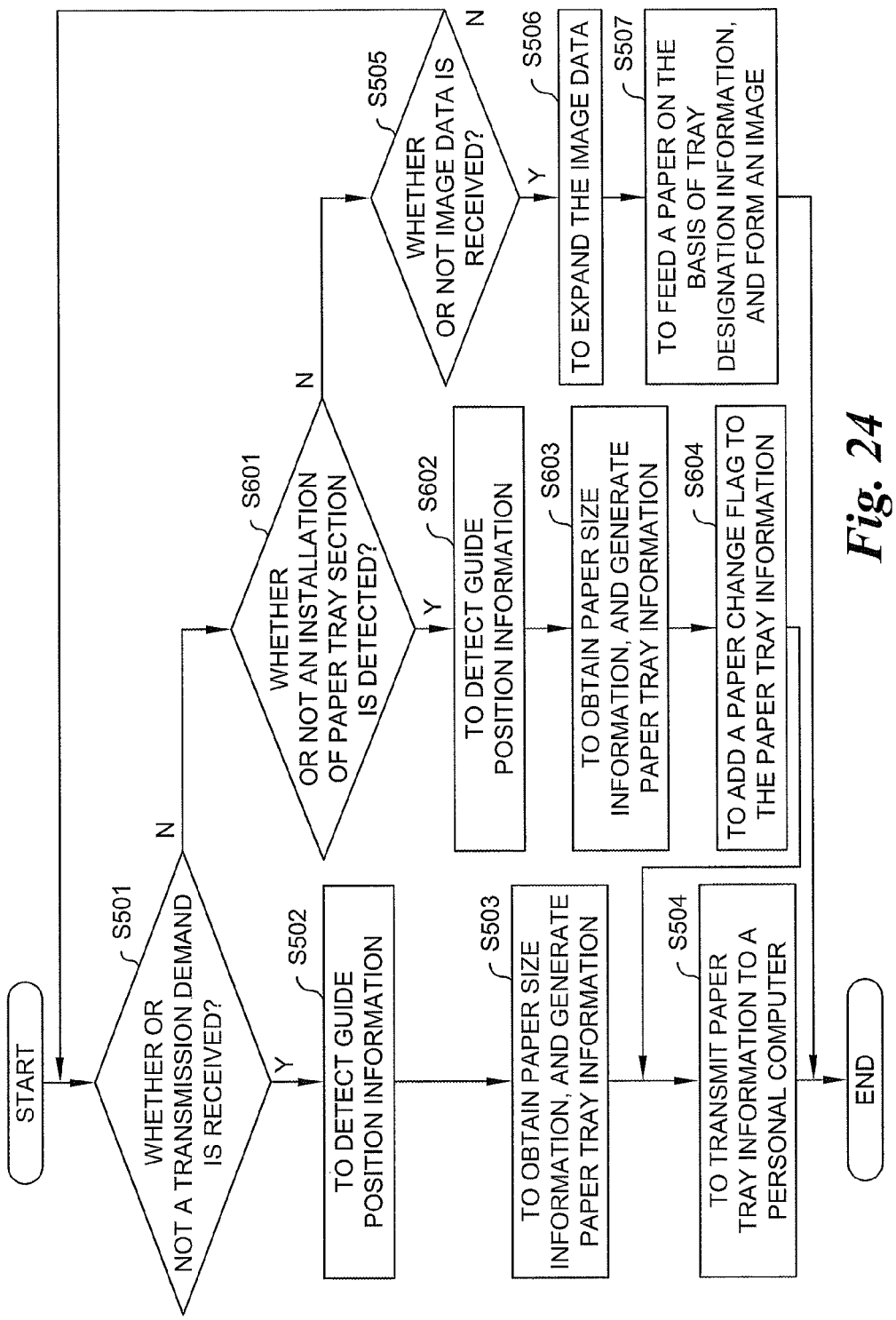
FIG. 24 is a flow chart for explaining an operation of a printer in embodiment 2.

In the present embodiment, firstly, it is to explain an operation of the printer 92 by using a flow chart shown by FIG. 24.

FIG. 24 is a flow chart for explaining an operation of a printer in embodiment 3.

The operation of the printer 92 is the same as that of embodiment 1 in the case to receive a transmission demand of paper size information or image data for print from the personal computer 91, so explanations are omitted. Here, it is to explain an operation of the printer 12 in the case that the installation of the paper tray section 28 is detected.

In the printer 92, the installation detecting section 95, after detected the installation of the paper tray section 28 (Step S601), notifies the mechanism controlling section 104 of it.

Continuously, the paper size obtaining section 105 performs a detection instruction to the mechanism section 103.

In the mechanism section 103, the paper size detecting section 86, on the basis of the detection instruction from the mechanism controlling section 104, obtains guide position information by respectively detecting positions of the paper guides 29 (FIG. 9) in the lower paper tray 28-1 and the upper paper tray 28-2 through the optics sensors 31-1 and 31-2, and then transmits it to the mechanism controlling section 104 (Step S602).

Continuously, the paper size obtaining section 105, on the basis of respective guide position information received from the mechanism section 103, obtains respective paper size information, as shown by FIG. 11, and generates paper tray information (Step S603).

Further, the paper size obtaining section 105 generates a paper change flag "1", as shown by FIG. 23, and adds the paper change flag to the paper tray information (Step S604). Then, the paper size obtaining section 105 transmits the paper tray information to the printer transmitting section 84.

Next, the printer transmitting section 84 transmits the paper tray information composed of the paper size information and the paper change flag to the personal computer 91 (Step S504). Thus, the generating and transmitting process of paper tray information is completed in the printer 92.

As stated above, after the installation of the paper tray section 28 is detected and paper size information corresponding to respective paper trays is obtained, paper tray information is generated by adding a paper change flag, and is sent to the personal computer 91.

Figure 25:
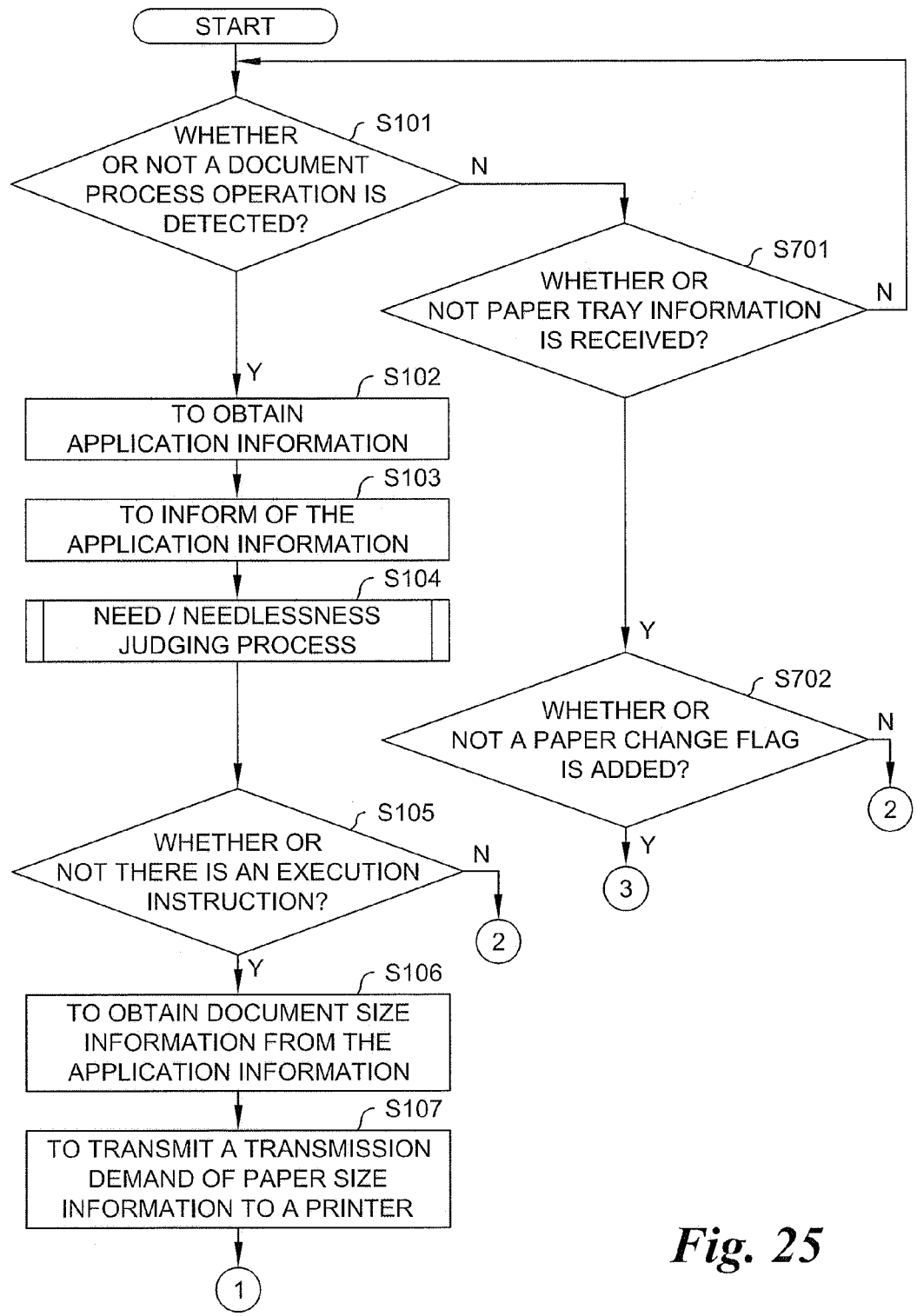
FIG. 25 is a first flow chart for explaining an inquiry control operation of a personal computer in embodiment 2 of the present invention.
Figure 26:
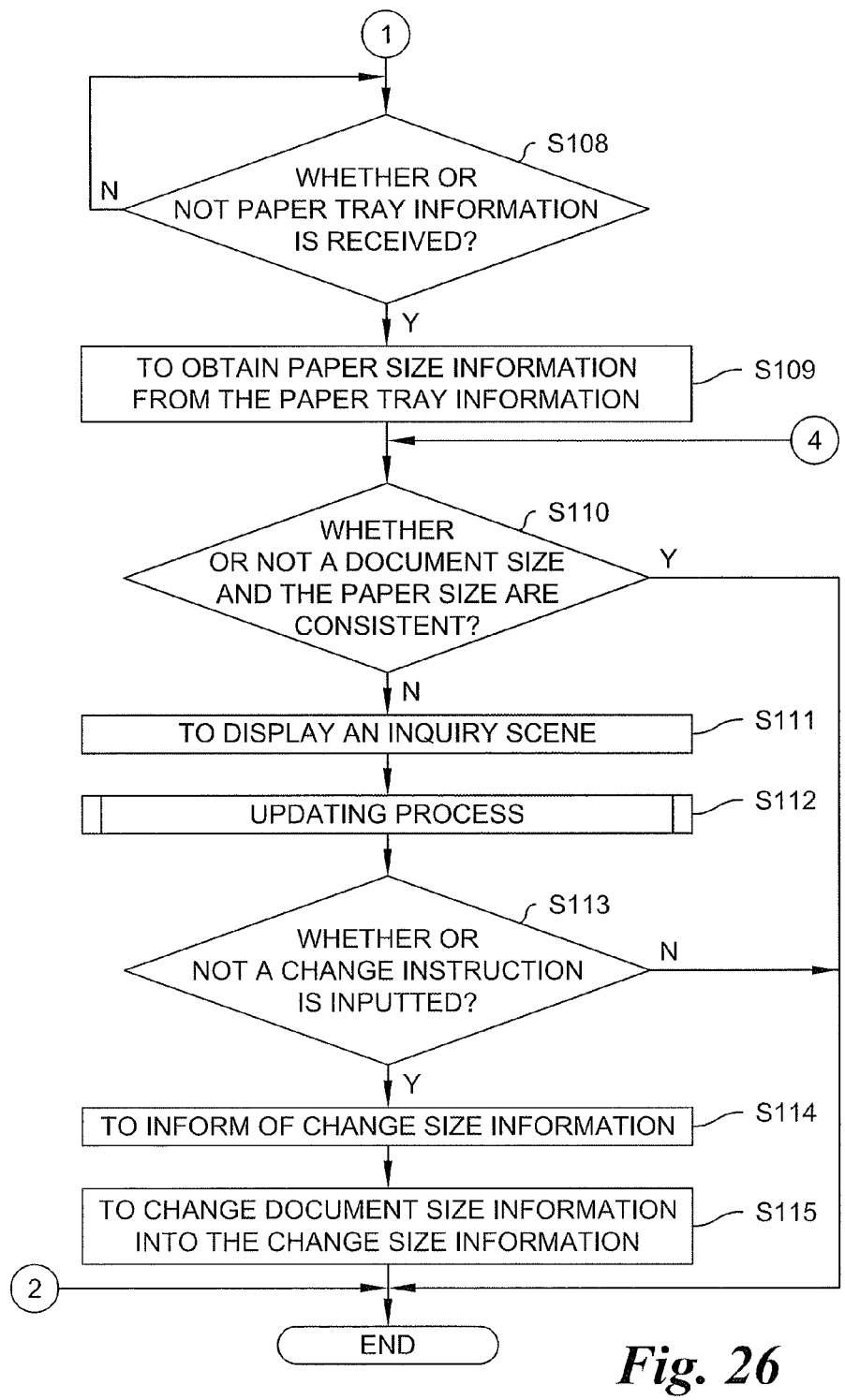
FIG. 26 is a second flow chart for explaining an inquiry control operation of a personal computer in embodiment 2 of the present invention.
Figure 27:
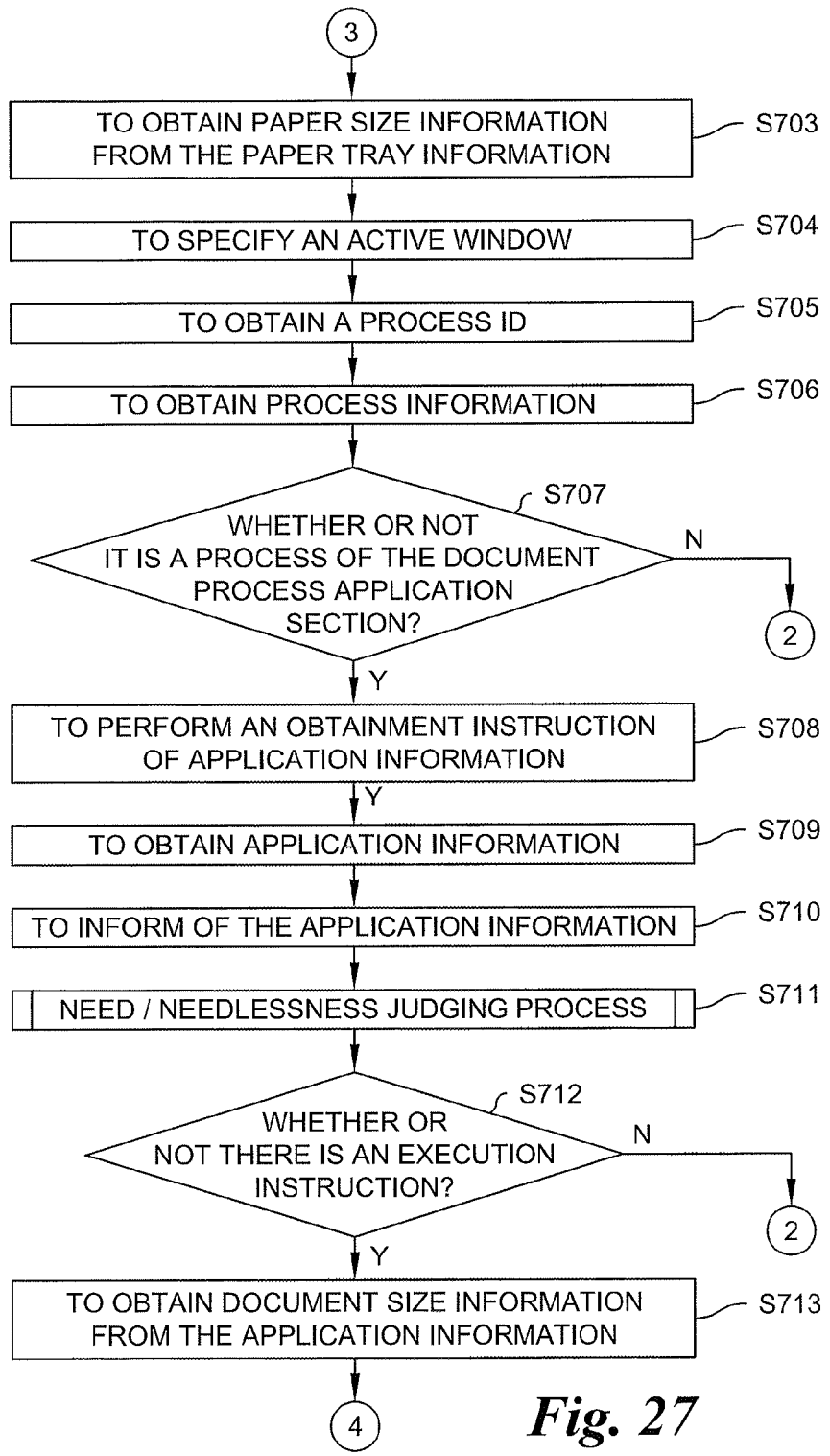
FIG. 27 is a third flow chart for explaining an inquiry control operation of a personal computer in embodiment 2 of the present invention.

Next, it is to explain an operation of the personal computer 91 of the present embodiment by following a flow chart shown by FIG. 25, FIG. 26 and FIG. 27.

FIG. 25 is a first flow chart for explaining an inquiry control operation of a personal computer in embodiment 2 of the present invention; FIG. 26 is a second flow chart for explaining an inquiry control operation of a personal computer in embodiment 2 of the present invention; and FIG. 27 is a third flow chart for explaining an inquiry control operation of a personal computer in embodiment 2 of the present invention.

Because the operation of the personal computer 91 in the case that a document process operation is detected is the same as that of embodiment 1, so explanations are omitted. In the present embodiment, it is to explain an operation of the personal computer 91 in the case to receive paper tray information from the printer 92.

In the personal computer 91, the paper size receiving section 101 of the paper size watching section 97, after received paper tray information from the printer 92 (Step S701), the paper size receiving section 101 judges whether or not a paper change flag is added to the paper tray information (Step S702). When the paper change flag is not added, the personal computer 91 completes the process.

For example, as shown by FIG. 23, when a paper change flag is added to paper tray information (Step S702), the paper size receiving section 101 obtains respective paper size information from the paper tray information (Step S703). The paper size receiving section 101 notifies the inquiring process controlling section 98 of the obtained respective paper size information and paper change information.

The executing section 102 of the inquiring process controlling section 98, after received the paper change information and the paper size information from the paper size watching section 97, performs a search instruction to the searching section 93.

Then, the searching section 93 specifies an active window by performing a search of windows (Step S704).

Continuously, the searching section 93 obtains a process ID of a program in starting in the active window (Step S705).

Next, the searching section 93 obtains process information on the basis of the obtained process ID (Step S706).

Then, the searching section 93 refers to the obtained process information, and judges whether or not the process is a process in starting in the document process application section 96 (Step S707). After it is judged that the process is not a process of the document process application section 96, the personal computer 91 completes the process.

After it is judged that the process is a process of the document process application section 96 (Step S707), the searching section 93 notifies the application information demanding section 94 of the process ID. Then, the application information demanding section 94 performs an obtainment instruction of application information with respect to the document process application section 96 (Step S708).

In the application watching section 99 of the document process application section 96, the application information obtaining section 100 obtains application information from the edition processing section 55 on the basis of the obtainment instruction from the inquiring process controlling section 98 (Step S709). The application information obtaining section 100 notifies the application information notifying section 61 of the obtained application information.

Then, the application information notifying section 61 notifies the inquiring process controlling section 98 of the informed application information (Step S710).

After the application information is informed from the document process application section 96, the judging section 70 of the inquiring process controlling section 98 performs a need/needlessness judgment about whether or not a comparing and judging process of document size of a process object document and paper size of paper set in the printer 92 is executed (Step S711). Because the flow of need/needlessness judging process in the judging section 70 is the same as that of embodiment 1 (FIG. 14), so explanations are omitted.

After the need/needlessness judging process is executed through the judging section 70 (Step S711), and an execution instruction is performed (Step S712), the executing section 72 performs an obtainment instruction to the document size obtaining section 73 in order to obtain document size information.

The document size obtaining section 73 obtains document size information from the application information received from the document process application section 96 on the basis of the obtainment instruction, and then notifies the executing section 102 of it.

Then, the executing section 72 transmits the document size information informed from the document size obtaining section 73 along with the paper change information and the paper size information that are informed from the paper size watching section 97 to the comparing and judging section 74. Then, the comparing and judging section 74 compares the document size information with the paper size information, and judges whether or not they are consistent, that is, performs a comparing and judging process (Step S110).

When document size information is consistent with paper size information, the comparing and judging section 74 judges that paper of paper size that is consistent with document size is set in any one of paper tray of the printer 92. Thus, the inquiry controlling process is completed in the personal computer 91.

When it is judged that document size information and paper size information are not consistent, that is, inconsistent (Step S110), the comparing and judging section 74 notifies the executing section 102 of the judgment result representing inconsistency.

Then, the executing section 102 informs of document size information and paper size information with respect to the inquiring section 75, and then performs an inquiry instruction.

The inquiring section 75 displays an inquiry scene 40 (FIG. 6) on the display 27 on the basis of the inquiry instruction from the executing section 102 (Step S111).

Further, the executing section 102 informs of a process ID and a document name with respect to the updating section 78, and then performs an updating instruction. On the basis of the updating instruction, the updating section 78 updates the storing section 71 (Step S112).

On the display of the inquiry scene 40 (FIG. 6), when any one of the selection buttons 42a and 42b is selected, the inputting section 76 inputs a change instruction of document size and tray designation information (Step S113). On the basis of the input, the executing section 102 notifies the changing section 77 of paper size information corresponding to the inputted tray designation information as change size information (Step S114). Then, the changing section 77 transmits a change demand and the change size information to the document process application section 96.

After the document process application section 96 receives the change demand and the change size information from the inquiring process controlling section 98, the setting section 58 changes a setting of document size information into the change size information with respect to the process object document (Step S115). Thus, the inquiry controlling process is completed in the personal computer 91.

As stated above, after a paper change is detected in the printer 12, a comparing and judging process of document size of a process object document in the document process through the document process application section 96 and paper size of the printer 92 is executed, when they are not consistent, the inquiring process is executed.

Further, because the operation of the personal computer 91 is the same as that of embodiment 1 in the case that the print instruction is performed through the instructing section 57, so explanations are omitted.

As stated above, according to the printer system 90 of the present embodiment, because the printer 92, after detected the installation of the paper tray section 28, is capable of obtaining paper size information of the paper tray section 28 and informing the personal computer 92 of it, it is possible for the personal computer 92 to detect the inconsistency of document size and paper size not only when a document process operation is detected but also when a paper change is detected. Therefore, it becomes possible to further restrain the occurrence of the failure print.

The Utilization Possibility in Industry:

In respective embodiments stated above, a printer is adopted as an image forming apparatus that is connected to an image processing apparatus. However, the present invention is not limited in the case. For example, it is also possible to adopt MFP that has both FAX function and scanner function.

The present invention is not limited to the foregoing embodiments but many modifications and variations are possible within the spirit and scope of the appended claims of the invention.

What is claimed is:

1. An image processing apparatus connected to an image forming apparatus, that has a document processing section for performing a creation and an editing of document data of a print object document based on document size information; and an instructing section for instructing printing of the print object document, comprising:
   an operation detecting section that detects an operation of the document processing section;
   a document size obtaining section that obtains the document size information to mean at least the size of a direction orthogonal to the print medium feed direction;
   a medium size obtaining section that obtains medium size information of print mediums set in the image forming apparatus that the medium size information means at least the size of a direction orthogonal to the print medium feed direction;
   a comparing and judging section that compares the document size information and the medium size information that are obtained when the operation detecting section detects an operation of the document processing section, and judges whether or not the document size information and the medium size information are consistent; and
   a reporting section that reports an inconsistency to a user when the document size information and the medium size information are not consistent.

2. The image processing apparatus according to claim 1, further comprising:
   a storing section that stores document data,
   wherein the document processing section reads out the document data from the storing section, and performs an editing of the document data; and
   the operation detecting section detects a readout operation of the document data through the document processing section.

3. The image processing apparatus according to claim 1, wherein the operation detecting section detects new creation operation of document data through the document processing section.

4. The image processing apparatus according to claim 1, wherein the document processing section has a setting section that sets the document size information; and
   the operation detecting section detects a setting operation of the document size information through the setting section.

5. The image processing apparatus according to claim 1, wherein the document processing section selects any one of print object documents as a selection document, and edits document data of the selected document;
   the operation detecting section detects the selection operation through the document processing section;
   the document size obtaining section obtains selection document size information corresponding to the selection document;
   the comparing and judging section compares the selection document size information and the medium size information, and judges whether or not they are consistent; and
   the inquiring section inquires the user whether or not the selection document size information of the selection document is changed when the selection document size information and the medium size information are judged not to be consistent.

6. The image processing apparatus according to claim 5, further comprising:
   a storing section that stores inquiry history information through the inquiring section, which correspond to respective print object documents, corresponding to document discrimination information;
   a judging section that judges whether or not the corresponding inquiry history information has been stored on the basis of the document discrimination information of a selection document when selection operation of the selection document is detected through the operation detecting section; and
   an executing section that makes the document size obtaining section and the medium size obtaining section execute an obtainment operation, and the comparing and judging section execute a comparison and judgment operation, when the corresponding inquiry history information is judged not to be stored.

7. The image processing apparatus according claim 6, further comprising:
   an updating section that updates the storing section,
   wherein the inquiring section executes an inquiry operation when the comparing and judging section judges that the selection document size information and the medium size information are not consistent; and
   the updating section generates inquiry history information corresponding to the selection document on the basis of the inquiry operation, and updates the storing section.

8. The image processing apparatus according to claim 6, wherein the inquiry history information contains time information representing inquiry time through the inquiring section;
   the judging section further judges whether or not a fixed time has been passed from the inquiry time on the basis of the time information when the inquiry history information is judged to be stored; and
   the executing section executes the obtainment operation, and the comparison and judgment operation when the fixed time is judged to have been passed.

9. The image processing apparatus according to claim 8, further comprising:
an updating section that updates the storing section,
wherein the inquiring section executes an inquiry operation when the comparing and judging section judges that the selection document size information and the medium size information are not consistent; and
the updating section generates inquiry history information corresponding to the selection document on the basis of the inquiry operation, and updates the storing section.

10. The image processing apparatus according to claim 1, further comprising:
a change detecting section that detects a change operation of print mediums in the image forming apparatus,
wherein the medium size obtaining section further obtains medium size information of print mediums after being changed; and
the comparing and judging section further performs a comparison and judgment operation between the medium size information and the document size information.

11. The image processing apparatus of claim 1, further comprising:
a converting section for converting the document data into print use image data for sending to the image forming apparatus based on the instruction;
an inquiring section that inquires a user whether or not document size of the print object document is changed when the document size information and the medium size information are not consistent;
an inputting section that inputs a change instruction of the document size; and
a changing section that changes the document size information into the medium size information on the basis of the change instruction.

12. An image processing system that includes an image forming apparatus for forming images onto print mediums and an image processing apparatus that is connected to the image forming apparatus and has a document processing section for performing a creation and an editing of document data of a print object document based on document size information; and an instructing section for instructing printing of the print object document, wherein the image processing apparatus comprises:
an operation detecting section that detects operations of the document processing section;
a document size obtaining section that obtains the document size information to mean at least the size of a direction orthogonal to the print medium feed direction;
a medium size obtaining section that obtains medium size information of print mediums set in the image forming apparatus that the medium size information means at least the size of a direction orthogonal to the print medium feed direction;
a comparing and judging section that compares the document size information and the medium size information that are obtained, and judges whether or not the document size information and the medium size information are consistent; and
a reporting section that reports an inconsistency to a user when the document size information and the medium size information are not consistent.

13. The image processing system according to claim 12, wherein the image processing apparatus further comprises a demand transmitting section that transmits a transmission demand of medium size information to the image forming apparatus; and
the image forming apparatus further comprises:
a demand receiving section that receives the transmission demand from the image processing apparatus;
a medium size detecting section that detects medium size information; and
a medium size transmitting section that transmits the detected medium size information to the image processing apparatus,
wherein the medium size obtaining section is formed from a medium size receiving section that receives the medium size information from the image forming apparatus.

14. The image processing system according to claim 12, wherein the image processing apparatus further comprises a storing section that stores document data;
the document processing section reads out the document data from the storing section, and performs an editing of the document data; and
the operation detecting section detects a readout operation of the document data through the document processing section.

15. The image processing system according to claim 12, wherein the document processing section selects any one of print object documents as a selection document, and create document data of the selected document;
the operation detecting section detects the selection operation through the document processing section;
the document size obtaining section obtains selection document size information corresponding to the selection document;
the comparing and judging section compares the selection document size information and the medium size information, and judges whether or not they are consistent; and
the inquiring section inquires the user whether or not the selection document size information of the selection document is changed when the selection document size information and the medium size information are judged not to be consistent.

16. The image processing system according to claim 15, wherein the image processing apparatus further comprises:
a storing section that stores inquiry history information through the inquiring section, which correspond to respective print object documents, corresponding to document discrimination information;
a judging section that judges whether or not the corresponding inquiry history information has been stored on the basis of the document discrimination information of the selection document when a selection operation of the selection document is detected through the operation detecting section; and
an executing section that makes the document size obtaining section and the medium size obtaining section execute an obtainment operation, and the comparing and judging section execute a comparison and judgment operation, when the corresponding inquiry history information is judged not to be stored.

17. The image processing system according claim 16, wherein the image processing apparatus further comprises an updating section that updates the storing section;
the inquiring section executes an inquiry operation when the comparing and judging section judges that the selection document size information and the medium size information are not consistent; and
the updating section generates inquiry history information corresponding to the selection document on the basis of the inquiry operation, and updates the storing section.

18. The image processing system according to claim 16,
wherein the inquiry history information contains time information representing inquiry time through the inquiring section;
the judging section further judges whether or not a fixed time has been passed from the inquiry time on the basis of the time information when the inquiry history information is judged to be stored; and
the executing section executes the obtainment operation, and the comparison and judgment operation when the fixed time is judged to have been passed.

19. The image processing system according to claim 18,
wherein the image processing apparatus further comprises an updating section that updates the storing section;
the inquiring section executes an inquiry operation when the comparing and judging section judges that the selection document size information and the medium size information are not consistent; and
the updating section generates inquiry history information corresponding to the selection document on the basis of the inquiry operation, and updates the storing section.

20. The image processing system according to claim 12,
wherein the image processing apparatus further comprises a change detecting section that detects a change operation of print mediums in the image forming apparatus;
the medium size obtaining section further obtains medium size information of print mediums after being changed; and
the comparing and judging section further performs a comparison and judgment operation between the medium size information and the document size information.

21. The image processing system according to claim 20,
wherein the image processing apparatus further comprises:
an accommodating section set capable of being attached and removed, and accommodates print mediums;
an installation detection section that detects an installation of the accommodating section;
a medium size detecting section that detects medium size information of print mediums in the accommodating section; and
a medium size transmitting section that transmits medium information that is composed of installation information representing the installation and the detected medium size information to the image processing apparatus;
the change detecting section is formed from a reception notifying section that receives the installation information and the medium information from the image forming apparatus and notifies the medium size obtaining section of them; and
the medium size obtaining section obtains the medium size information from the informed medium information.

22. The image processing system of claim 12, further comprising:
a converting section for converting the document data into print use image data for sending to the image forming apparatus based on the instruction;
an inquiring section that inquires a user whether or not document size of the print object document is changed when the document size information and the medium size information are not consistent;
an inputting section that inputs a change instruction of the document size; and
a changing section that changes the document size information into the medium size information on the basis of the change instruction.

23. A method for processing an image with an image processing apparatus connected to an image forming apparatus, that has a document processing section for performing a creation and an editing of document data of a print object document based on document size information and an instructing section for instructing printing of the print object document, the method comprising the steps of:
detecting an operation of the document processing section;
obtaining the document size information to mean at least the size of a direction orthogonal to the print medium feed direction;
obtaining medium size information of print mediums set in the image forming apparatus that the medium size information means at least the size of a direction orthogonal to the print medium feed direction;
comparing the document size information and the medium size information that are obtained when the operation of the document processing section is detected;
judging whether or not the document size information and the medium size information are consistent; and
reporting an inconsistency to a user when the document size information and the medium size information are not consistent.

24. The method for processing an image in accordance with claim 23, further comprising the steps of:
converting the document data into print use image data for sending to the image forming apparatus based on the instruction;
inquiring whether or not document size of the print object document is changed when the document size information and the medium size information are not consistent;
inputting a change instruction of the document size; and
changing the document size information into the medium size information on the basis of the change instruction.

25. A method for processing an image with an image processing system that includes an image forming apparatus for forming images onto print mediums and an image processing apparatus that is connected to the image forming apparatus and has a document processing section for performing a creation and an editing of document data of a print object document based on document size information and an instructing section for instructing printing of the print object document, the method comprising the steps of:
detecting operations of the document processing section;
obtaining the document size information to mean at least the size of a direction orthogonal to the print medium feed direction;
obtaining medium size information of print mediums set in the image forming apparatus that the medium size information means at least the size of a direction orthogonal to the print medium feed direction;
comparing the document size information and the medium size information;
judging whether or not the document size information and the medium size information are consistent; and
reporting an inconsistency to a user when the document size information and the medium size information are not consistent.

26. The method for processing an image in accordance with claim 25, further comprising the steps of:
converting the document data into print use image data for sending to the image forming apparatus based on the instruction;
inquiring whether or not document size of the print object document is changed when the document size information and the medium size information are not consistent;
inputting a change instruction of the document size; and changing the document size information into the medium size information on the basis of the change instruction.

\* \* \* \* \*